US012205524B2

(12) United States Patent
Lee et al.

(10) Patent No.: US 12,205,524 B2
(45) Date of Patent: Jan. 21, 2025

(54) DISPLAY DEVICE, METHOD OF MANUFACTURING THE DISPLAY DEVICE, AND TILED DISPLAY DEVICE INCLUDING THE DISPLAY DEVICE

(71) Applicant: Samsung Display Co., LTD., Yongin-si (KR)

(72) Inventors: Dong Sung Lee, Suwon-si (KR); Byung Hoon Kim, Hwaseong-si (KR); Tae Oh Kim, Suwon-si (KR); So Chan Park, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/978,431

(22) Filed: Nov. 1, 2022

(65) Prior Publication Data

US 2023/0274691 A1     Aug. 31, 2023

(30) Foreign Application Priority Data

Feb. 28, 2022   (KR) .................. 10-2022-0026128

(51) Int. Cl.
*G09G 3/36* (2006.01)
*G02F 1/13* (2006.01)
*G02F 1/1362* (2006.01)
*G09G 3/32* (2016.01)
*G09G 3/3225* (2016.01)
*H01L 27/15* (2006.01)
(Continued)

(52) U.S. Cl.
CPC .............. *G09G 3/32* (2013.01); *G09G 3/3225* (2013.01); *G09G 2300/026* (2013.01); *G09G 2300/0426* (2013.01); *G09G 2330/028* (2013.01)

(58) Field of Classification Search
CPC ...... G09G 3/32–3225; G09G 2300/026–0426; G06G 2330/028
See application file for complete search history.

(56) References Cited

U.S. PATENT DOCUMENTS 10,879,339 B2   12/2020 Ke et al.
2012/0199946 A1 *  8/2012 Kageyama .............. H01L 28/75
                                                                257/532
(Continued)

FOREIGN PATENT DOCUMENTS

CN        113314509 A  *  8/2021  ............. H01L 25/04
JP        2017-161887        9/2017
KR        10-2019-0142793    12/2019

*Primary Examiner* — Lin Li
(74) *Attorney, Agent, or Firm* — KILE PARK REED & HOUTTEMAN PLLC

(57) ABSTRACT

A display device comprises a first substrate including a first contact hole, a first barrier insulating layer disposed on the first substrate and including a second contact hole, a fan-out line disposed in a first metal layer on the first barrier insulating layer, the fan-out line including a protruding part inserted in the second contact hole to protrude from below the first barrier insulating layer, and a recessed part formed by the second contact hole, an etching electrode disposed in the recessed part of the fan-out line, a second substrate disposed on the fan-out line and the etching electrode and including a third contact hole, a display layer disposed on the second substrate, and a flexible film disposed below the first substrate and inserted in the first contact hole to be electrically connected to the protruding part of the fan-out line.

20 Claims, 15 Drawing Sheets

(51) Int. Cl.
*H10B 12/00* (2023.01)
*H10K 50/844* (2023.01)
*H10K 59/131* (2023.01)

(56) References Cited

U.S. PATENT DOCUMENTS

| | | | | |
|---|---|---|---|---|
| 2016/0336540 | A1* | 11/2016 | Li | G02F 1/13 |
| 2019/0386087 | A1* | 12/2019 | Woo | G02F 1/136227 |
| 2020/0026119 | A1* | 1/2020 | Imazeki | G09G 3/3648 |
| 2020/0212131 | A1* | 7/2020 | Kim | H10K 71/00 |
| 2020/0359499 | A1* | 11/2020 | Hwu | H10K 59/131 |
| 2021/0005134 | A1* | 1/2021 | Kishimoto | H10K 71/00 |
| 2021/0202906 | A1* | 7/2021 | Kim | H10K 50/844 |
| 2021/0288220 | A1* | 9/2021 | Oh | H01L 27/156 |
| 2022/0037325 | A1* | 2/2022 | Kang | H10B 12/30 |
| 2022/0093828 | A1* | 3/2022 | Kwag | H01L 27/156 |
| 2022/0115572 | A1* | 4/2022 | Yang | H01L 33/005 |

* cited by examiner

DISPLAY DEVICE, METHOD OF MANUFACTURING THE DISPLAY DEVICE, AND TILED DISPLAY DEVICE INCLUDING THE DISPLAY DEVICE

CROSS-REFERENCE TO RELATED APPLICATION(S)

This application claims priority to and benefits of Korean Patent Application No. 10-2022-0026128 under 35 U.S.C. 119, filed on Feb. 28, 2022 in the Korean Intellectual Property Office, the entire contents of which are herein incorporated by reference.

BACKGROUND

1. Technical Field

The disclosure relates to a display device, a method of manufacturing the display device, and a tiled display device including the display device.

2. Description of the Related Art

As the information society has developed, the demand for display devices for displaying images has diversified. For example, display devices have been applied to various electronic devices such as smart phones, digital cameras, notebook computers, navigation systems, and smart televisions. Examples of display devices include flat panel display devices such as a liquid crystal display (LCD) device, a field emission display (FED) device, or an organic light-emitting diode (OLED) display device. A light-emitting display device, which is a type of flat panel display device, includes light-emitting elements capable of emitting light and can thus display an image without a requirement of a backlight unit for providing light to a display panel.

When a large-size display device is fabricated, the defect rate of light-emitting elements may increase due to an increase in the number of pixels, and the productivity or reliability of the display device may decrease. To address these problems, a tiled display device with a large screen may be implemented by connecting multiple display devices having a relatively small size. The tiled display device may include seams (or boundary portions) between the multiple display devices due to the presence of the non-display areas or bezels of the multiple display devices. However, when an image is being displayed on the entire screen of the tiled display device, the seams cause a sense of discontinuity, adversely affecting the sense of immersion of an image displayed across the multiple display devices.

SUMMARY

Aspects of the disclosure provide a display device capable of improving the reliability of fan-out lines, a method of manufacturing the display device, and a tiled display device including the display device.

Aspects of the disclosure also provide a display device capable of eliminating the sense of discontinuity between multiple display devices and enhancing the sense of immersion of an image by preventing boundary portions or non-display areas between the multiple display devices from becoming visible, a method of manufacturing the display device, and a tiled display device including the display device.

However, aspects of the disclosure are not restricted to those set forth herein. The above and other aspects of the disclosure will become more apparent to one of ordinary skill in the art to which the disclosure pertains by referencing the detailed description of the disclosure given below.

According to an embodiment of the disclosure, a display device may include a first substrate including a first contact hole, a first barrier insulating layer disposed on the first substrate and including a second contact hole, a fan-out line disposed in a first metal layer on the first barrier insulating layer, the fan-out line including a protruding part inserted in the second contact hole to protrude from below the first barrier insulating layer, and a recessed part formed by the second contact hole, an etching electrode disposed in the recessed part of the fan-out line, a second substrate disposed on the fan-out line and the etching electrode and including a third contact hole, a display layer disposed on the second substrate, and a flexible film disposed below the first substrate and inserted in the first contact hole to be electrically connected to the protruding part of the fan-out line.

A height of a top surface of the etching electrode may be less than a height of a top surface of the fan-out line.

A thickness of the etching electrode may be greater than a thickness of the fan-out line, and the thickness of the fan-out line may be greater than a thickness of the protruding part of the fan-out line.

The thickness of the fan-out line may be at least twice the thickness of the protruding part of the fan-out line.

The thickness of the etching electrode may be about 1.2 to about 2 times greater than the thickness of the fan-out line.

The thickness of the etching electrode may be about 3000 Å or more, the thickness of the fan-out line may be about 2000 Å or more, and the thickness of the protruding part of the fan-out line may be about 500 Å or more.

The fan-out line may include titanium, and the etching electrode may include copper.

The display device may further include a display driver mounted on the flexible film and providing at least one of a data voltage, a power supply voltage, and a gate signal.

The display layer may include a connection line disposed in a second metal layer on the second substrate, and a thin-film transistor disposed in an active layer on the second metal layer and in a third metal layer.

The flexible film may provide at least one of a data voltage, a power supply voltage, and a gate signal to the thin-film transistor through the fan-out line and the connection line.

The display device may further include a voltage line disposed in the second metal layer and electrically connected to the thin-film transistor.

The display device may further include a connection electrode disposed in a fourth metal layer on the third metal layer. An end of the connection electrode may be connected to the voltage line. Another end of the connection electrode may be connected to the thin-film transistor.

The display device may further include a light-emitting element layer disposed on the fourth metal layer. The light-emitting element layer may include a first electrode connected to the connection electrode, a second electrode disposed in a same layer as the first electrode, and light-emitting elements aligned between the first and second electrodes and electrically connected between the first and second electrodes.

According to an embodiment of the disclosure, a method of manufacturing a display device may include providing a substrate, providing a barrier insulating layer disposed on the substrate and including a first contact hole, forming a fan-out line disposed on the barrier insulating layer and including a protruding part inserted in the first contact hole and a recessed part formed by the first contact hole, forming an etching electrode on the fan-out line, etching the fan-out line and the etching electrode such that the etching electrode remains in the recessed part, forming a display layer on the fan-out line and the etching electrode, forming a second contact hole penetrating from below the substrate, and forming a flexible film disposed below the substrate, inserted in the second contact hole, and electrically connected to the protruding part of the fan-out line.

The forming of the second contact hole may include partially etching the protruding part of the fan-out line.

A thickness of the fan-out line may be at least twice a thickness of the protruding part of the fan-out line where partially-etched.

The thickness of the etching electrode may be about 3000 Å or more, the thickness of the fan-out line may be about 2000 Å or more, and the thickness of the partially-etched protruding part of the fan-out line may be about 500 Å or more.

The forming the second contact hole may include performing at least one of laser etching and atmospheric pressure (AP) plasma etching.

A thickness of the etching electrode may be about 1.2 to about 2 times greater than a thickness of the fan-out line.

According to an embodiment of the disclosure, a tiled display device may include a plurality of display devices, each of the plurality of display devices having a display area including pixels, and a non-display area surrounding the display area, and a bonding member bonding the plurality of display devices to each other. Each of the display devices may include a first substrate including a first contact hole, a first barrier insulating layer disposed on the first substrate and including a second contact hole, a fan-out line disposed in a first metal layer on the first barrier insulating layer, the fan-out line including a protruding part inserted in the second contact hole to protrude from below the first barrier insulating layer, and a recessed part formed by the second contact hole, an etching electrode disposed in the recessed part of the fan-out line, a second substrate disposed on the fan-out line and the etching electrode and including a third contact hole, a display layer disposed on the second substrate, and a flexible film disposed below the first substrate and inserted in the first contact hole to be electrically connected to the protruding part of the fan-out line.

According to the aforementioned and other embodiments of the disclosure, as a protruding part of a fan-out line has a thickness, the protruding part may still be able to remain below a barrier insulating layer, even if excessively etched, and may thus be able to be readily connected to a lead electrode of a flexible film. Thus, even in case that at least one of laser etching and AP plasma etching is used, the reliability of the protruding part of the fan-out line can be improved.

As display drivers below a substrate may be electrically connected to connection lines on the substrate, the size of the non-display area of a display device can be minimized. Accordingly, the distance between multiple display devices included in a tiled display device can be minimized, and as a result, the non-display area or the seam between the multiple display devices can be prevented from becoming recognizable to a user.

It should be noted that the effects of the disclosure are not limited to those described above, and other effects of the disclosure will be apparent from the following description.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
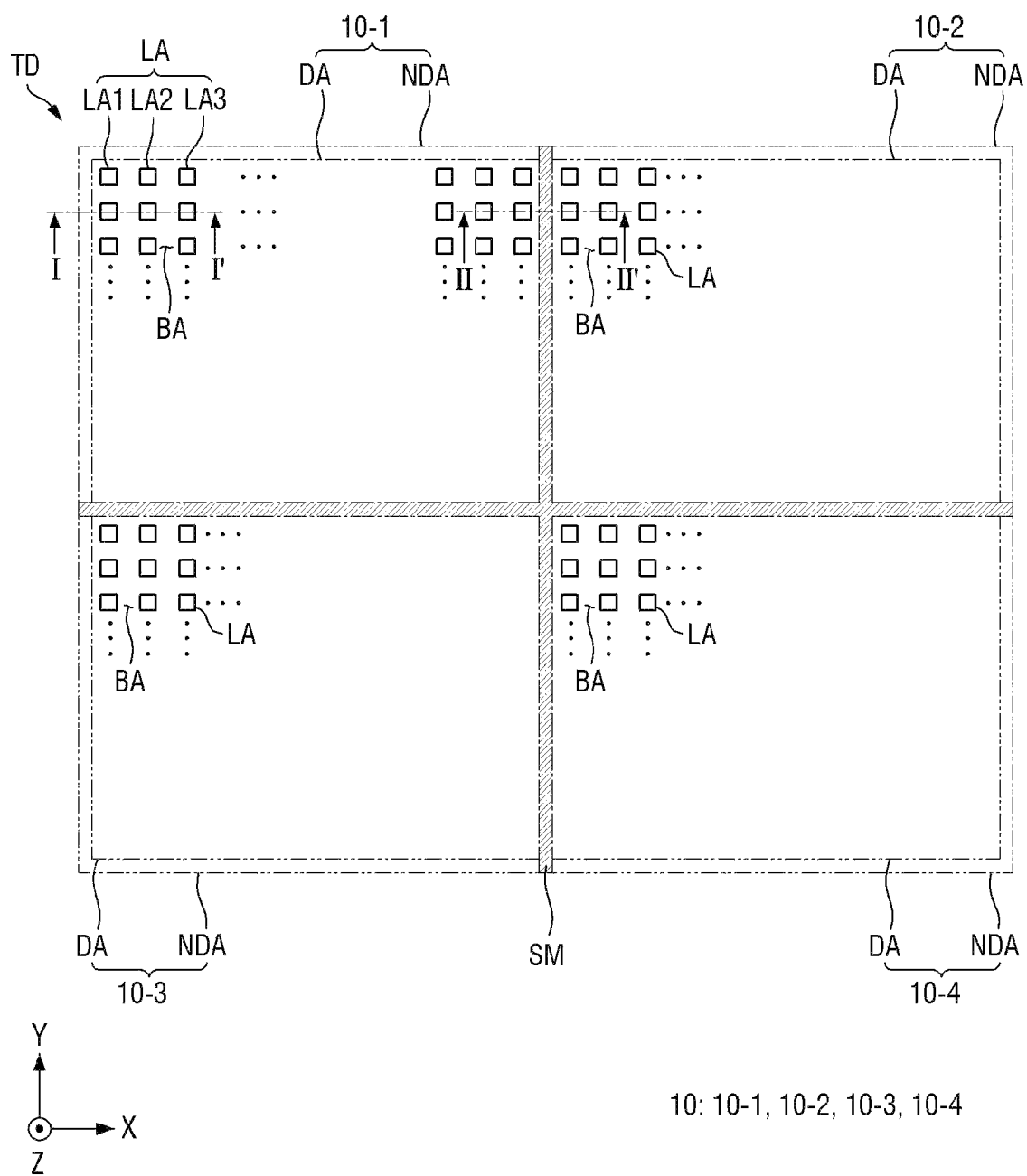
FIG. 1 is a schematic plan view of a tiled display device according to an embodiment of the disclosure.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In some instances, structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in other embodiments without departing from the disclosure.

Unless otherwise specified, the illustrated embodiments are to be understood as providing features of varying detail of some ways in which the disclosure may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there may be no intervening elements or layers present. To this end, the term "connected" may refer to physical, electrical, and/or fluid connection, with or without intervening elements.

Further, the X-axis, the Y-axis, and the Z-axis may not be limited to three axes of a rectangular coordinate system, and thus the X-, Y-, and Z-axes, and may be interpreted in a broader sense. For example, the X-axis, the Y-axis, and the Z-axis may be perpendicular to one another, or may represent different directions that are not perpendicular to one another.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items. The terms "and" and "or" may be used in the conjunctive or disjunctive sense and may be understood to be equivalent to "and/or."

Although the terms "first," "second," and the like may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "has," "having," "includes," and/or "including," when used herein, specify the presence of stated features, integers, steps, operations, elements, components, and/or groups thereof, but do not preclude the presence or addition of one or more other features, integers, steps, operations, elements, components, and/or groups thereof. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Various embodiments are described herein with reference to sectional and/or exploded illustrations that may be schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature, and the shapes of these regions may not reflect actual shapes of regions of a device and are not necessarily intended to be limiting.

As customary in the field, some embodiments are described and illustrated in the accompanying drawings in terms of functional blocks, units, parts, and/or modules. Those skilled in the art will appreciate that these blocks, units, parts, and/or modules may be physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

Unless otherwise defined or implied herein, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or overly formal sense, unless clearly so defined herein.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

FIG. 1 is a schematic plan view of a tiled display device according to an embodiment of the disclosure.

Referring to FIG. 1, a tiled display device TD may include multiple display devices 10. The display devices 10 may be arranged in a lattice pattern, but the disclosure is not limited thereto. The display devices 10 may be connected in a first direction (or an X-axis direction) or a second direction (or a Y-axis direction), and the tiled display device TD may have a particular shape. For example, the display devices 10 may all have the same size, but the disclosure is not limited thereto. In another example, the display devices 10 may have different sizes.

The tiled display device TD may include first through fourth display devices 10-1 through 10-4. The number of display devices 10 included in the tiled display device TD and how the display devices 10 may be coupled to one another are not particularly limited. The number of display devices 10 included in the tiled display device TD may be determined by the size of the display devices 10 and the size of the tiled display device TD.

The display devices 10 may have a rectangular shape with a pair of long sides and a pair of short sides. The display devices 10 may be arranged by connecting the long sides or the short sides of each of the display devices 10. Some of the display devices 10 may be arranged along the edges of the tiled display device TD to form the sides of the tiled display device TD. Some of the display devices 10 may be arranged at the corners of the tiled display device TD to form each pair of adjacent sides of the tiled display device TD. Some of the display devices 10 may be disposed in the middle of the tiled display device TD and may be surrounded by other display devices 10.

Each of the display devices 10 may include a display area DA and a non-display area NDA. The display area DA may include pixels and may display an image. Each of the pixels may include organic light-emitting diodes (OLEDs) including organic light-emitting layers, quantum-dot light-emitting diodes (QLEDs) including quantum-dot light-emitting layers, micro-light-emitting diodes (microLEDs), or inorganic light-emitting diodes (LEDs) including an inorganic semiconductor. Each of the pixels will hereinafter be described as including inorganic LEDs, but the disclosure is not limited thereto. The non-display area NDA may be disposed around the display area DA to surround the display area DA and may not display an image.

Each of the display devices 10 may include pixels, which may be arranged in multiple rows and multiple columns, in the display area DA. Each of the pixels may include an emission area LA, which may be defined by a pixel-defining film or a bank, and may emit light having a peak wavelength through the emission area LA. For example, the display area DA of each of the display devices 10 may include first emission areas LA1, second emission areas LA2, and third emission areas LA3. The first emission areas LA1, the second emission areas LA2, and the third emission areas LA3 may be areas that output light generated by light-emitting elements of each of the display devices 10 to the outside of the tiled display device TD.

The first emission areas LA1, the second emission areas LA2, and the third emission areas LA3 may emit light having a peak wavelength to the outside of the tiled display device TD. The first emission areas LA1, the second emission areas LA2, and the third emission areas LA3 may emit first-color light, second-color light, and third-color light, respectively. For example, the first-color light may be red light having a peak wavelength of about 610 nm to about 650 nm, the second-color light may be green light having a peak wavelength of about 510 nm to about 550 nm, and the third-color light may be blue light having a peak wavelength of about 440 nm to about 480 nm. However, the disclosure is not limited to this example.

The first emission areas LA1, the second emission areas LA2, and the third emission areas LA3 may be sequentially arranged in the first direction (or the X-axis direction) in each of the display areas DA. For example, the third emission areas LA3 may be larger in size than the first emission areas LA1, and the first emission areas LA1 may be larger in size than the second emission areas LA2. However, the disclosure is not limited to this example. In another example, the first emission areas LA1, the second emission areas LA2, and the third emission areas LA3 may all have substantially the same size.

The display area DA of each of the display devices 10 may further include a light-blocking area BA, which surrounds the first emission areas LA1, the second emission areas LA2, and the third emission areas LA3. The light-blocking area BA may prevent beams of light emitted from the first emission areas LA1, the second emission areas LA2, and the third emission areas LA3 from being mixed together.

The tiled display device TD may generally have a flat shape, but the disclosure is not limited thereto. The tiled display device TD may have a stereoscopic shape and may thus provide a sense of depth to a user. For example, in a case where the tiled display device TD has a stereoscopic shape, at least some of the display devices 10 may have a curved shape. In another example, the display devices 10 may all have a flat shape and may be connected to one another at an angle so that the tiled display device TD may have a stereoscopic shape.

The tiled display device TD may include a bonding area SM, which may be disposed between multiple display areas DA. The tiled display device TD may be obtained by connecting the non-display areas NDA of the display devices 10. The display devices 10 may be connected to one another via a bonding member or an adhesive member disposed in the bonding area SM. The bonding area SM may not include pad units or flexible films attached to pad units. Thus, the distance between the display areas DA of the display devices 10 may be so close that the bonding area SM may become almost invisible to the user. The reflectance of the display areas DA of the display devices 10 may be substantially the same as the reflectance of the bonding area SM. Thus, the tiled display device TD can overcome the sense of discontinuity between the display devices 10 and improve the degree of immersion of an image by preventing the bonding area SM from becoming recognizable to the user.

Figure 2:
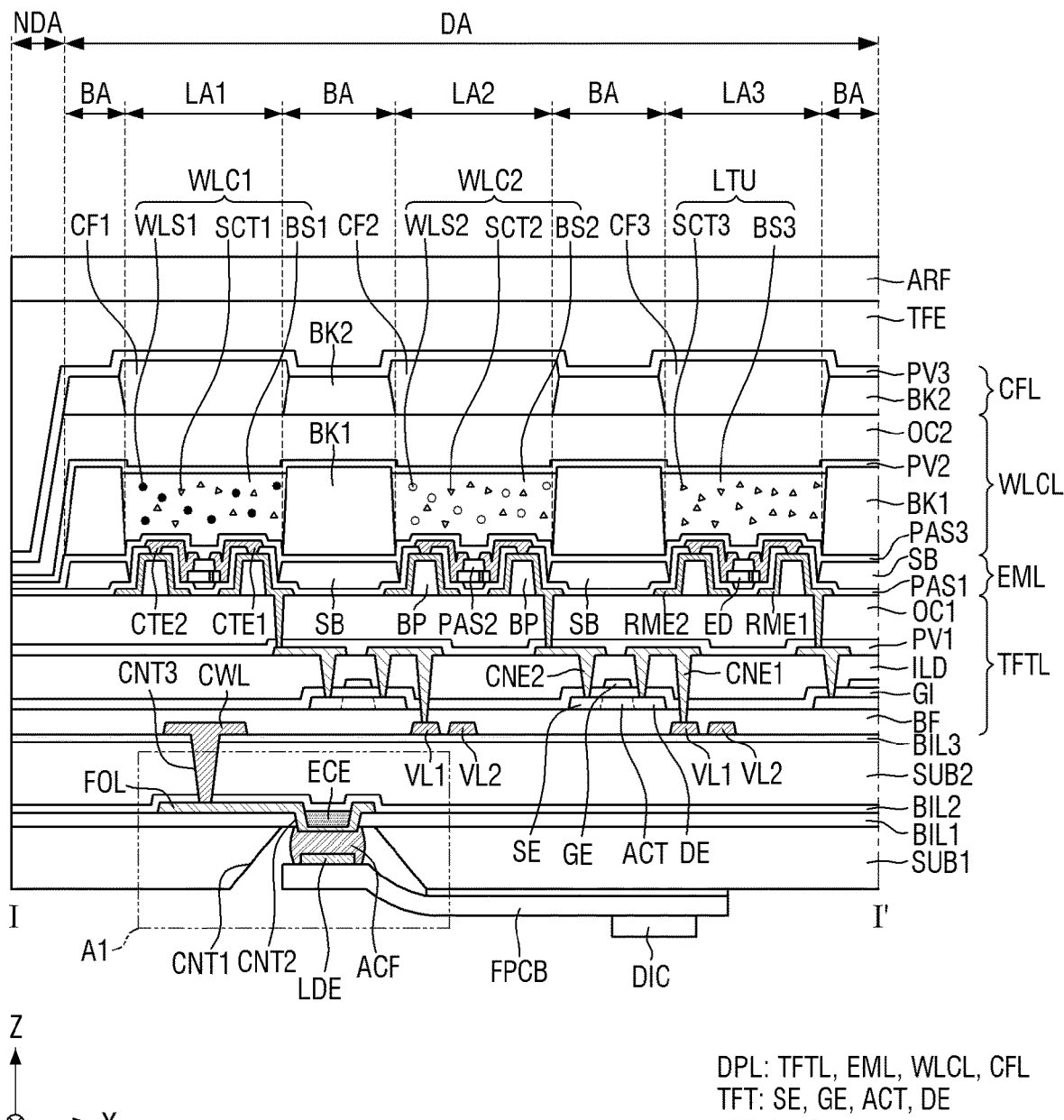
FIG. 2 is a schematic cross-sectional view taken along line I-I' of FIG. 1.
Figure 3:
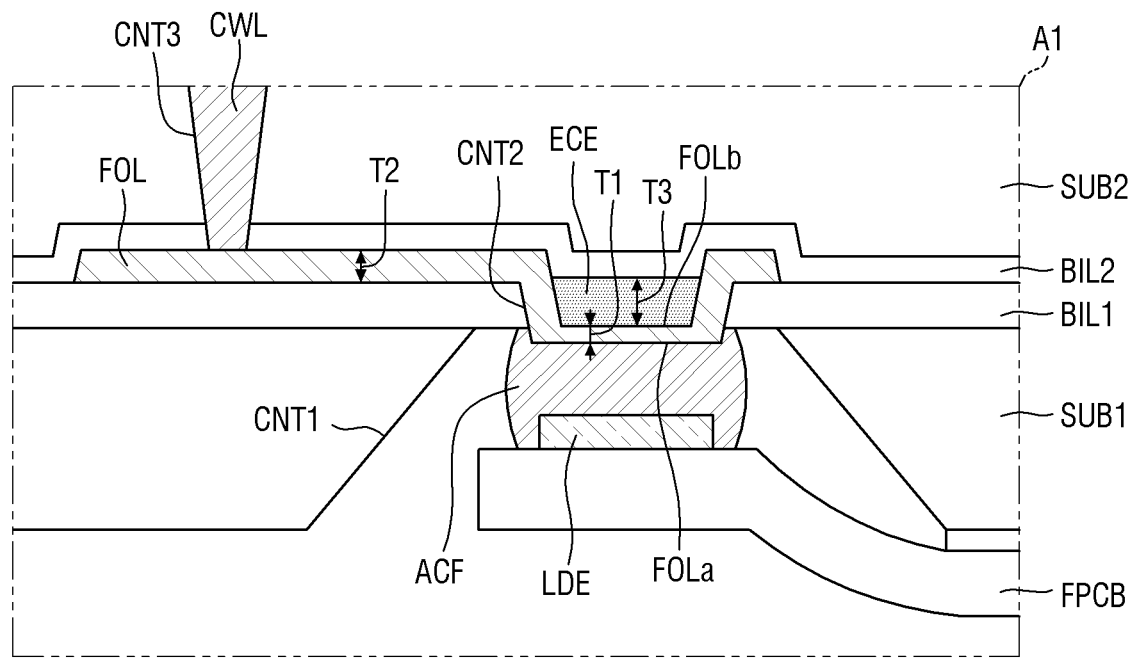
FIG. 3 is an enlarged schematic cross-sectional view of area A1 of FIG. 2.
Figure 4:
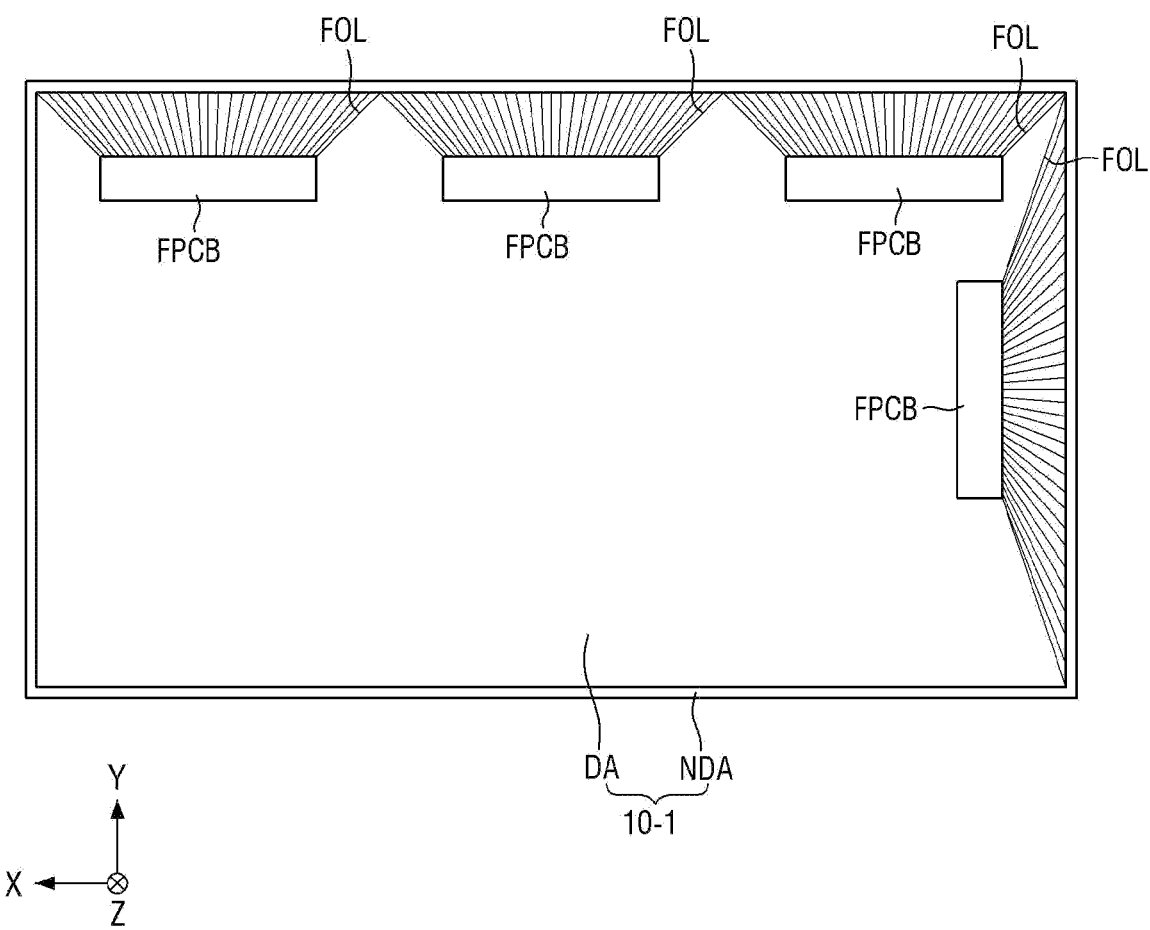
FIG. 4 is a schematic bottom view of a display device according to an embodiment of the disclosure.
Figure 5:
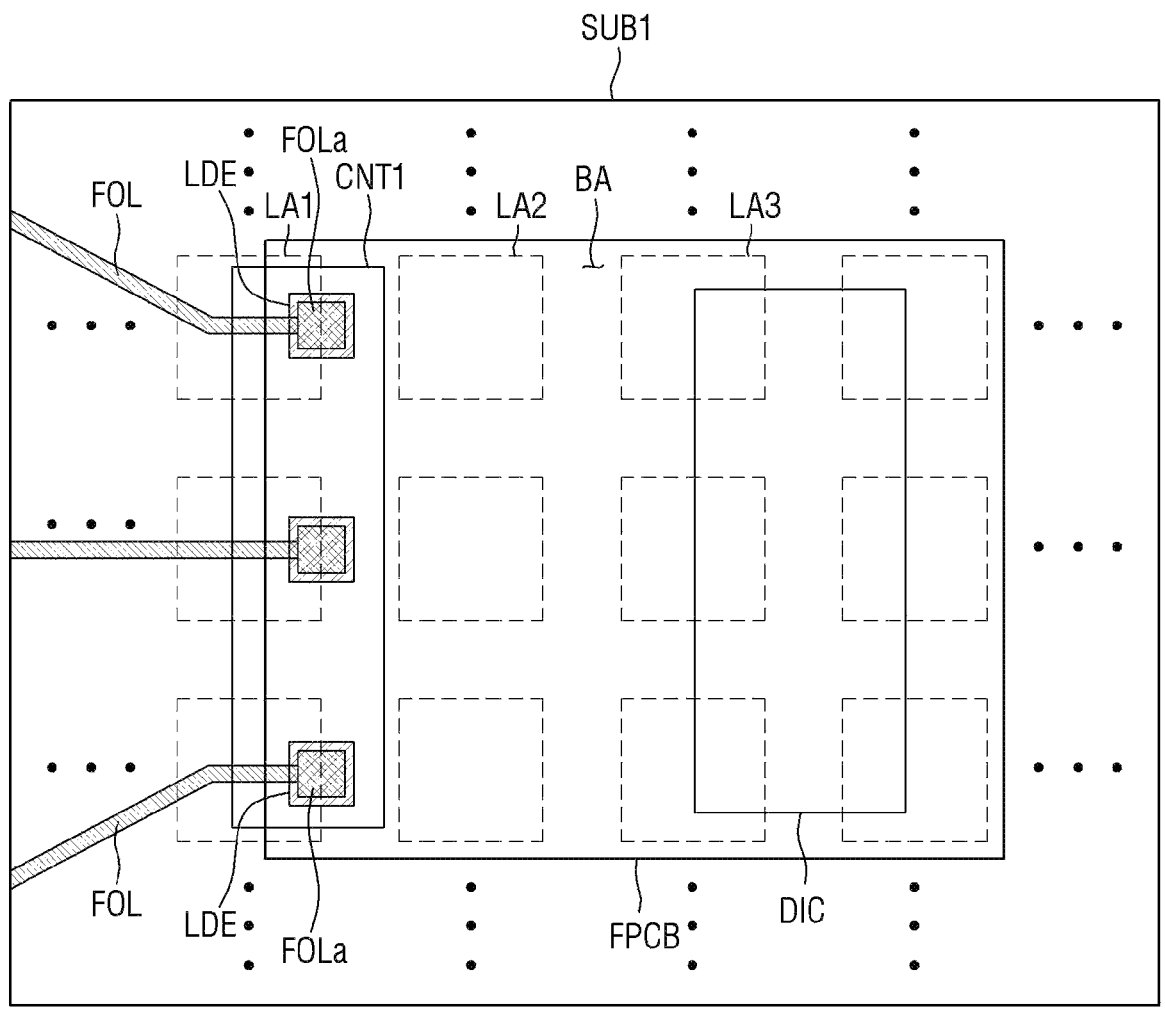
FIG. 5 is an enlarged schematic bottom view of the display device of FIG. 4.

FIG. 2 is a schematic cross-sectional view taken along line I-I' of FIG. 1. FIG. 3 is an enlarged schematic cross-sectional view of area A1 of FIG. 2. FIG. 4 is a schematic bottom view of a display device according to an embodiment of the disclosure. FIG. 5 is an enlarged schematic bottom view of the display device of FIG. 4.

Referring to FIGS. 2 through 5, a display area DA of a display device 10 may include first emission areas LA1, second emission areas LA2, and third emission areas LA3. The first emission areas LA1, the second emission areas LA2, and the third emission areas LA3 may be areas that output light generated by light-emitting elements ED of the display device 10 to the outside of the display device 10.

The display device 10 may include a first substrate SUB1, a first barrier insulating layer BIL1, a first metal layer MTL1, etching electrodes ECE, a second substrate SUB2, a second barrier insulating layer BIL2, a third barrier insulating layer BIL3, a display layer DPL, an encapsulation layer TFE, an antireflection film ARF, flexible films FPCB, and display drivers DIC.

The first substrate SUB1 may support the display device 10. The first substrate SUB1 may be a base substrate or a base member. The first substrate SUB1 may be a flexible substrate that may be bendable, foldable, and/or rollable. For example, the first substrate SUB1 may include an insulating material such as a polymer resin, for example, polyimide, but the disclosure is not limited thereto. In other embodiments, the first substrate SUB1 may be a rigid substrate including a glass material.

The first substrate SUB1 may include first contact holes CNT1. The first contact holes CNT1 may be etched from the bottom surface of the first substrate SUB1 to penetrate through to the top surface of the first substrate SUB1. For example, the lower width of the first contact holes CNT1 may be greater than the upper width of the first contact holes CNT1. During the fabrication of the display device 10, protruding parts FOLa of fan-out lines FOL, which may be inserted in second contact holes CNT2, may be exposed by the first contact holes CNT1, and the fan-out lines FOL may be electrically connected to lead electrodes LDE of the flexible films FPCB through connecting films ACF, which may be inserted in the first contact holes CNT1.

The first barrier insulating layer BIL1 may be disposed on the first substrate SUB1. The first barrier insulating layer BIL1 may include an inorganic film capable of preventing the infiltration of the air or moisture. For example, the first barrier insulating layer BIL1 may include at least one of a silicon nitride layer, a silicon oxynitride layer, a silicon oxide layer, a titanium oxide layer, an aluminum oxide layer, and an amorphous silicon layer, but the disclosure is not limited thereto.

The first barrier insulating layer BIL1 may include the second contact holes CNT2. The second contact holes CNT2 may be etched from the top surface of the first barrier insulating layer BIL1 to penetrate through to the bottom surface of the first barrier insulating layer BIL1. For example, the upper width of the second contact holes CNT2 may be greater than the lower width of the second contact holes CNT2.

The first metal layer MTL1 may be disposed on the first barrier insulating layer BIL1. The first metal layer MTL1 may include fan-out lines FOL. The first metal layer MTL1 may be formed as a single layer or a multilayer including at least one of molybdenum (Mo), aluminum (Al), chromium (Cr), gold (Au), silver (Ag), titanium (Ti), nickel (Ni), palladium (Pd), indium (In), neodymium (Nd), and copper (Cu). For example, the fan-out lines FOL may include Ti and may thus be able to be readily formed on the first barrier insulating layer BIL1. However, the material of the fan-out lines FOL is not particularly limited The fan-out lines FOL may electrically connect the flexible films FPCB and the connection lines CWL. The protruding parts FOLa of the fan-out lines FOL may be inserted in the second contact holes CNT2 and may thus protrude beyond the bottom surface of the first barrier insulating layer BIL1 and be exposed by the first contact holes CNT1 of the first substrate SUB1. The protrusions FOLa of the fan-out lines FOL may be electrically connected to the lead electrodes LDE of the flexible films FPCB through the connecting films ACF. The fan-out lines FOL may be electrically connected to data lines, power lines, or gate lines through the connection lines CWL. The data lines or the power lines may be connected to drain electrodes DE of thin-film transistors (TFTs) "TFT". The gate lines may be connected to gate electrodes GE of the TFTs "TFT". Thus, the fan-out lines FOL may provide data voltages, power supply voltages, or gate signals from the display drivers DIC of the flexible films FPCB to the TFTs "TFT". As the display device 10 includes the fan-out lines FOL in the display area DA, the size of the non-display area NDA can be minimized.

During laser etching or atmospheric pressure (AP) plasma etching, the etching rate of the etching electrodes ECE may be much faster than the etching rate of the fan-out lines FOL. Referring to FIG. 3, the protruding parts FOLa of the fan-out lines FOL may have a first thickness T1, the rest of the fan-out lines FOL may have a second thickness T2, and the etching electrodes ECE may have a third thickness T3. The third thickness T3 may be greater than the second thickness T2, and the second thickness T2 may be greater than the first thickness T1. The second thickness T2 may be about at least twice the first thickness T1. The third thickness T3 may be about 1.2 to about 2 times greater than the second thickness T2. For example, the first thickness T1 may be, but is not limited to, about 500 Å or greater, the second thickness T2 may be, but is not limited to, about 2000 Å or greater, and the third thickness T3 may be, but is not limited to, about 3000 Å or greater. Therefore, even if the protruding parts FOLa of the fan-out lines FOL may be excessively etched during the etching of the first substrate SUB1, parts of the protruding parts FOLa may still be able to remain below the first barrier insulating layer BIL1 and may thus be readily connected to the lead electrodes LDE of the flexible films FPCB. Accordingly, even in case that at least one of laser etching and AP plasma etching is used, the reliability of the protruding parts FOLa of the fan-out lines FOL can be improved.

The etching electrodes ECE may be disposed in recessed parts FOLb of the fan-out lines FOL. The etching electrodes ECE may be able to remain in the recessed parts FOLb of the fan-out lines FOL, which may be formed by the second contact holes CNT2, due to their different etching rate from the fan-out lines FOL. The height of the top surfaces of the etching electrodes ECE may be less than the height of the top surfaces of the fan-out lines FOL, but the disclosure is not limited thereto. The etching electrodes ECE may prevent the second substrate SUB2 from being depressed, and as a result, the second substrate SUB2 may have a flat top surface.

The etching electrodes ECE may be formed as a single layer or a multilayer including at least one of Mo, Al, Cr, Au, Ag, Ti, Ni, Pd, In, Nd, and Cu. For example, the etching electrodes ECE may include CU, but the disclosure is not limited thereto.

The second barrier insulating layer BIL2 may be disposed on the first barrier insulating layer BIL1, the first metal layer MTL1, and the filler members FIL. The second barrier insulating layer BIL2 may include an inorganic film capable of preventing the infiltration of the air or moisture. For example, the second barrier insulating layer BIL2 may include at least one of a silicon nitride layer, a silicon oxynitride layer, a silicon oxide layer, a titanium oxide layer, an aluminum oxide layer, and an amorphous silicon layer, but the disclosure is not limited thereto.

The second substrate SUB2 may be disposed on the second barrier insulating layer BIL2. The second substrate SUB2 may be a base substrate or a base member. The second substrate SUB2 may be a flexible substrate that is bendable, foldable, and/or rollable. For example, the second substrate SUB2 may include an insulating material such as a polymer resin, for example, polyimide, but the disclosure is not limited thereto.

The third barrier insulating layer BIL3 may be disposed on the second substrate SUB2. The third barrier insulating layer BIL3 may include an inorganic film capable of preventing the infiltration of the air or moisture. For example, the second barrier insulating layer BIL2 may include at least one of a silicon nitride layer, a silicon oxynitride layer, a silicon oxide layer, a titanium oxide layer, an aluminum oxide layer, and an amorphous silicon layer, but the disclosure is not limited thereto.

The third barrier insulating layer BIL3, the second substrate SUB2, and the second barrier insulating layer BIL2 may include third contact holes CNT3. The third contact holes CNT3 may be etched from the top surface of the third barrier insulating layer BIL3 to penetrate through to the bottom surface of the second barrier insulating layer BIL2. For example, the upper width of the third contact holes CNT3 may be greater than the lower width of the third contact holes CNT3. During the fabrication of the display device 10, the top surfaces of the fan-out lines FOL may be exposed by the third contact holes CNT3, and the fan-out lines FOL may be in contact with the connection lines CWL, which may be inserted in the third contact holes CNT3.

The display layer DPL may be disposed on the third barrier insulating layer BIL3. The display layer DPL may include a TFT layer TFTL, a light-emitting element layer EML, a wavelength conversion layer WLCL, and a color filter layer CFL. The TFT layer TFTL may include a second metal layer MTL2, a buffer layer BF, an active layer ACTL, a gate insulating layer GI, a third metal layer MTL3, an interlayer insulating layer ILD, a fourth metal layer MTL4, a first passivation layer PV1, and a first planarization layer OC1.

The second metal layer MTL2 may be disposed on the third barrier insulating layer BIL3. The second metal layer MTL2 may include the connection lines CWL, first voltage lines VL1, and second voltage lines VL2. The connection lines CWL, the first voltage lines VL1, and the second voltage lines VL2 may be formed in the same layer and of the same material, but the disclosure is not limited thereto. For example, the second metal layer MTL2 may be formed as a single layer or a multilayer including at least one of Mo, Al, Cr, Au, Ag, Ti, Ni, Pd, In, Nd, and Cu.

The connection lines CWL may be inserted in the third contact holes CNT3 and may thus be connected to the fan-out lines FOL. For example, the connection lines CWL may be electrically connected to the data lines and may provide data voltages to the TFTs "TFT". The connection lines CWL may be electrically connected to the power lines and may provide power supply voltages to the TFTs "TFT". The connection lines CWL may be connected to the gate lines and may provide gate signals to the gate electrodes GE of the TFTs "TFT". Thus, the connection lines CWL may provide the data voltages, the power supply voltages, or the gate signals from the display drivers DIC to the TFTs "TFT" through the fan-out lines FOL.

The first voltage lines VL1 and the second voltage lines VL2 may extend in the second direction (or the Y-axis direction) in the display area DA. The first voltage lines VL1 and the second voltage lines VL2 may be electrically connected to the fan-out lines FOL. The first voltage lines VL1 and the second voltage lines VL2 may be electrically connected to the TFTs "TFT" or the light-emitting elements ED. For example, the first voltage lines VL1 and the second voltage lines VL2 may be the data lines, driving voltage lines, low-potential lines, and/or initialization voltage lines, but the disclosure is not limited thereto.

The buffer layer BF may be disposed on the second metal layer MTL2 and the third barrier insulating layer BIL3. The buffer layer BF may include an inorganic material capable of preventing the infiltration of the air or moisture. For example, the buffer layer BF may include inorganic films that may be alternately stacked on each other.

The active layer ACTL may be disposed on the buffer layer BF. The active layer ACTL may include semiconductor regions ACT, the drain electrodes DE, and the source electrodes SE of the TFTs "TFT". The semiconductor regions ACT may overlap the gate electrodes GE in a thickness direction (or a Z-axis direction) and may be insulated from the gate electrodes GE by the gate insulating layer GI. The drain electrodes DE and the source electrodes SE may be obtained by forming conductors using the material of the semiconductor regions ACT. The TFTs "TFT" may form pixel circuits of the pixels. For example, the TFTs "TFT" may be driving transistors or switching transistors of the pixel circuits.

The gate insulating layer GI may be disposed on the active layer ACTL and the buffer layer BF. The gate insulating layer GI may insulate the semiconductor regions ACT and the gate electrodes of the TFTs "TFT". The gate insulating layer GI may include contact holes that may be penetrated by first connection electrodes CNE1 and second connection electrodes CNE2.

The third metal layer MTL3 may be disposed on the gate insulating layer GI. The third metal layer MTL3 may include the gate electrodes GE of the TFTs "TFT". The gate electrodes GE may overlap the semiconductor regions ACT with the gate insulating layer GI interposed therebetween. The gate electrodes GE may receive gate signals from the gate lines. For example, the third metal layer MTL3 may be formed as a single layer or a multilayer including at least one of Mo, Al, Cr, Au, Ag, Ti, Ni, Pd, In, Nd, and Cu.

The interlayer insulating layer ILD may be disposed on the third metal layer MTL3. The interlayer insulating layer ILD may insulate the third and fourth metal layers MTL3 and MTL4. The interlayer insulating layer ILD may include contact holes that may be penetrated by the first connection electrodes CNE1 and the second connection electrodes CNE2.

The fourth metal layer MTL4 may be disposed on the interlayer insulating layer ILD. The fourth metal layer MTL4 may include the first connection electrodes CNE1 and the second connection electrodes CNE2. The first connection electrodes CNE1 and the second connection electrodes CNE2 may be formed in the same layer and of the same material, but the disclosure is not limited thereto. For example, the fourth metal layer MTL4 may be formed as a single layer or a multilayer including at least one of Mo, Al, Cr, Au, Ag, Ti, Ni, Pd, In, Nd, and Cu.

The first connection electrodes CNE1 may electrically connect the first volage lines VL1 and the drain electrodes DE of the TFTs "TFT". First ends of the first connection electrodes CNE1 may be in contact with the first voltage lines VL1 of the second metal layer MTL2, and second ends of the first connection electrodes CNE1 may be in contact with the drain electrodes DE of the active layer ACTL.

The second connection electrodes CNE2 may electrically connect the source electrodes SE of the TFTs "TFT" and first electrodes RME1. First ends of the second connection electrodes CNE may be in contact with the source electrodes SE of the active layer ACTL, and the first electrodes RME1 of the light-emitting element layer EML may be in contact with second ends of the second connection electrodes CNE2.

The first passivation layer PV1 may be disposed on the fourth metal layer MTL4 and the interlayer insulating layer ILD. The first passivation layer PV1 may protect the TFTs "TFT". The first passivation layer PV1 may include contact holes that may be penetrated by the first electrodes RME1.

The first planarization layer OC1 may be provided on the first PV1 and may planarize the tops of the TFTs "TFT". For example, the first planarization layer OC1 may include contact holes that may be penetrated by the first electrodes RME1. Here, the contact holes of the first planarization layer OC1 may be connected to the contact holes of the first PV1. The first planarization layer OC1 may include an organic insulating material such as polyimide.

The light-emitting element layer EML may be disposed on the TFT layer TFTL. The light-emitting element layer EML may include protruding patterns BP, the first electrodes RME1, second electrodes RME2, a first insulating layer PAS1, sub-banks SB, the light-emitting elements ED, a second insulating layer PAS2, the first contact electrodes CTE1, second contact electrodes CTE2, and a third insulating layer PAS3.

The protruding patterns BP may be disposed on the first planarization layer OC1. The protruding patterns BP may protrude from the top surface of the first planarization layer OC1. The protruding patterns BP may be disposed in emission areas LA or opening areas of the pixels. The light-emitting elements ED may be disposed between the protruding patterns BP. Each of the protruding patterns BP may have inclined side surfaces, and light emitted by the light-emitting elements ED may be reflected by the first or second electrodes RME1 or RME2 on the protruding patterns BP. For example, the protruding patterns BP may include an organic insulating material such as polyimide.

The first electrodes RME1 may be disposed on the first planarization layer OC1 and the protruding patterns BP. The first electrodes RME1 may be disposed on protruding patterns BP on first sides of the light-emitting elements ED. The first electrodes RME1 may be disposed on inclined side surfaces of the protruding patterns BP on the first sides of the light-emitting elements ED to reflect light emitted by the light-emitting elements ED. The first electrodes RME1 may be inserted in the contact holes of the first planarization layer OC1 and the first passivation layer PV1 and may thus be connected to the second connection electrodes CNE2. The first electrodes RME1 may be electrically connected to first ends of the light-emitting elements ED through the first contact electrodes CTE1. For example, the first electrodes RME1 may receive a voltage that may be proportional to the luminance of the light-emitting elements ED, from the TFTs "TFT".

The second electrodes RME2 may be disposed on the first planarization layer OC1 and the protruding patterns BP. The second electrodes RME2 may be disposed on protruding patterns BP on second sides of the light-emitting elements ED. The second electrodes RME2 may be disposed on inclined side surfaces of the protruding patterns BP on the second sides of the light-emitting elements ED to reflect light emitted by the light-emitting elements ED. The second electrodes RME2 may be electrically connected to second ends of the light-emitting elements ED through the second contact electrodes CTE2. For example, the second electrodes RME2 may receive a low-potential voltage to be supplied to all the pixels from low-potential lines.

The first electrodes RME1 and the second electrodes RME2 may include a conductive material with high reflectance. For example, the first electrodes RME1 and the second electrodes RME2 may include at least one of Al, Ag, Cu, Ni, and lanthanum (La). In another example, the first electrodes RME1 and the second electrodes RME2 may include a material such as indium tin oxide (ITO), indium zinc oxide (IZO), or indium tin zinc oxide (ITZO). In yet another example, the first electrodes RME1 and the second electrodes RME2 may include either multilayers having transparent conductive material layers and metal layers with high reflectance or single layers including a transparent conductive material or a high-reflectance metal. The first electrodes RME1 and the second electrodes RME2 may have a stack structure such as ITO/Ag/ITO/, ITO/Ag/IZO, or ITO/Ag/ITZO/IZO.

The first insulating layer PAS1 may be disposed on the first planarization layer OC1, the first electrodes RME1, and the second electrodes RME2. The first insulating layer PAS1 may protect and insulate the first electrodes RME1 and the second electrodes RME2. The first insulating layer PAS1 may prevent the light-emitting elements ED from being placed in direct contact with the first electrodes RME1 and the second electrodes RME2 during the alignment of the light-emitting elements ED.

The sub-banks SB may be disposed in a light-blocking area BA, on the first insulating layer PAS1. The sub-banks SB may be disposed along the boundaries of each of the pixels to define and separate the pixels. The sub-banks SB may have a height and may include an organic insulating material such as polyimide.

The light-emitting elements ED may be disposed on the first insulating layer PAS1. The light-emitting elements ED may be aligned in parallel between the first electrodes RME1 and the second electrodes RME2. The length of the light-emitting elements ED may be greater than the distance between the first electrodes RME1 and the second electrodes RME2. Each of the light-emitting elements ED may include semiconductor layers, and the first ends and the second ends of the light-emitting elements ED may be defined based on the semiconductor layers. The first ends of the light-emitting elements ED may be disposed on the first electrodes RME1, and the second ends of the light-emitting elements ED may be disposed on the second electrodes RME2. The first ends of the light-emitting elements ED may be electrically connected to the first electrodes RME1 through the first contact electrodes CTE1, and the second ends of the light-emitting elements ED may be electrically connected to the second electrodes RME2 through the second contact electrodes CTE2.

The light-emitting elements ED may have a size of several micrometers or nanometers and may be inorganic light-emitting diodes (LEDs) including an inorganic material. The light-emitting elements ED may be aligned between each pair of opposing first and second electrodes RME1 and RME2 in accordance with an electric field formed in a particular direction between the corresponding pair of opposing first and second electrodes RME1 and RME2.

For example, the light-emitting elements ED may include active layers that include the same material, and may thus emit light of the same wavelength range or of the same color. Beams of light emitted from the first emission areas LA1, the second emission areas LA2, and the third emission areas LA3 of the light-emitting element layer EML may all have the same color. For example, the light-emitting elements ED may emit third-color light or blue light having a peak wavelength of about 440 nm to about 480 nm, but the disclosure is not limited thereto.

The second insulating layer PAS2 may be disposed on the light-emitting elements ED. For example, the second insulating layer PAS2 may surround parts of the light-emitting elements ED and may not cover both ends of each of the light-emitting elements ED. The second insulating layer PAS2 may protect the light-emitting elements ED and may fix the light-emitting elements ED during the fabrication of the display device 10. The second insulating layer PAS2 may fill the space between the light-emitting elements ED and the first insulating layer PAS1.

The first contact electrodes CTE1 may be disposed on the first insulating layer PAS1 and may be inserted in contact holes in the first insulating layer PAS1 to be connected to the first electrodes RME1. For example, the contact holes in the first insulating layer PAS1 may be provided above the protruding patterns BP, but the disclosure is not limited thereto. First ends of the first contact electrodes CTE1 may be connected to the first electrodes RME1, on the protruding patterns BP, and second ends of the first contact electrodes CTE1 may be connected to the first ends of the light-emitting elements ED.

The second contact electrodes CTE2 may be disposed on the first insulating layer PAS1 and may be inserted in contact holes in the first insulating layer PAS1 to be connected to the second electrodes RME2. For example, the contact holes in the first insulating layer PAS1 may be provided above the protruding patterns BP, but the disclosure is not limited thereto. First ends of the second contact electrodes CTE2 may be connected to the second ends of the light-emitting elements ED and second ends of the second contact electrodes CTE2 may be connected to the second electrodes RME2, on the protruding patterns BP.

The third insulating layer PAS3 may be disposed on the first contact electrodes CTE1, the second contact electrodes CTE2, the sub-banks SB, the first insulating layer PAS1, and the second insulating layer PAS2. The third insulating layer PAS3 may be disposed at the top of the light-emitting element layer EML to protect the light-emitting element layer EML.

The wavelength conversion layer WLCL may be disposed on the light-emitting element layer EML. The wavelength conversion layer WLCL may include first light-blocking members BK1, first wavelength converters WLC1, second wavelength converters WLC2, light transmitters LTU, a second passivation layer PV2, and a second planarization layer OC2.

The first light-blocking members BK1 may be disposed in the light-blocking area BA, on the third insulating layer PAS3. The first light-blocking members BK1 may overlap the sub-banks SB in the thickness direction (or the Z-axis direction). The first light-blocking members BK1 may block the transmission of light. The first light-blocking members BK1 may improve the color reproducibility of the display device 10 by preventing beams of light emitted from the first emission areas LA1, the second emission areas LA2, and the third emission areas LA3 from being mixed together. In a plan view, the first light-blocking members BK1 may be arranged in a lattice form to surround the first emission areas LA1, the second emission areas LA2, and the third emission areas LA3.

The first wavelength converters WLC1 may be disposed in the first emission areas LA1, on the third insulating layer PAS3. The first wavelength converters WLC1 may be surrounded by the first light-blocking members BK1. The first wavelength converters WLC1 may convert or shift the peak wavelength of incident light into a first peak wavelength. Each of the first wavelength converters WLC1 may include a first base resin BS1, a first scatterer SCT1, and a first wavelength shifter WLS1.

The first base resin BS1 may include a material with relatively high light transmittance. The first base resin BS1 may be formed of a transparent organic material. For example, the first base resin BS1 may include at least one of the following organic materials: an epoxy resin, an acrylic resin, a cardo resin, and an imide resin.

The first scatterer SCT1 may have a different refractive index from the first base resin BS1 and may form an optical interface with the first base resin BS1. For example, the first scatterer SCT1 may include a light-scattering material or light-scattering particles capable of scattering at least some of light passing through the first wavelength converters WLC1. For example, the first scatterer SCT1 may include a metal oxide such as titanium oxide ($TiO_2$), zirconium oxide ($ZrO_2$), aluminum oxide ($Al_2O_3$), indium oxide ($In_2O_3$), zinc oxide (ZnO), and/or tin oxide ($SnO_2$) or organic particles such as particles of an acrylic resin or a urethane resin. The first scatterer SCT1 may scatter light in random directions, regardless of the incidence direction of incident light thereupon, without substantially changing the peak wavelength of the incident light.

The first wavelength shifter WLS1 may convert or shift the peak wavelength of incident light into a first peak wavelength. For example, the first wavelength shifter WLS1 may convert blue light provided by the display device 10 into red light having a single peak wavelength of about 610 nm to about 650 nm and may emit the red light. The first wavelength shifter WLS1 may include quantum dots, quantum rods, and/or a phosphor. The quantum dots may be a particulate material that emits light of a particular color in response to the transition of the electrons from a conduction band to a valence band.

Some of blue light provided by the light-emitting element layer EML may not be converted into red light by the first wavelength shifters WLS1 of the first wavelength converters WLC1, but may pass through the first wavelength converters WLC1. Blue light incident upon first color filters CF1 without being converted into red light by the first wavelength shifters WLS1 may be blocked by the first color filters CF1. Red light obtained from blue light by the first wavelength converters WLC1 may pass through the first color filters CF1 and may be emitted to the outside of the display device 10. Accordingly, the first emission areas LA1 may emit red light.

The second wavelength converters WLC2 may be disposed in the second emission areas LA2, on the third insulating layer PAS3. The second wavelength converters WLC2 may be surrounded by the first light-blocking members BK1. The second wavelength converters WLC2 may convert or shift the peak wavelength of incident light into a second peak wavelength. Each of the second wavelength converters WLC2 may include a second base resin BS2, a second scatterer SCT2, and a second wavelength shifter WLS2.

The second base resin BS2 may include a material with relatively high light transmittance. The second base resin BS2 may be formed of a transparent organic material. For example, the second base resin BS2 may include the same material as the first base resin BS1.

The second scatterer SCT2 may have a different refractive index from the second base resin BS2 and may form an optical interface with the second base resin BS2. For example, the second scatterer SCT2 may include a light-scattering material or light-scattering particles capable of scattering at least some of light passing through the second wavelength converters WLC2. For example, the second scatterer SCT2 may include the same material as the first scatterers SCT1 of the first wavelength converters WLC1.

The second wavelength shifter WLS2 may convert or shift the peak wavelength of incident light into a second peak wavelength, which is different from the first peak wavelength. For example, the second wavelength shifter WLS2 may convert blue light provided by the light-emitting element layer EML into green light having a single peak wavelength of 510 nm to 550 nm and may emit the red light. The second wavelength shifter WLS2 may include quantum dots, quantum rods, or a phosphor. The second wavelength shifter WLS2 may include the same material as the first wavelength shifters WLS1 of the first wavelength converters WLC1. The second wavelength shifter WLS2 may be formed as quantum dots, quantum rods, and/or a phosphor having a different wavelength conversion range from the first wavelength shifters WLS1 of the first wavelength converters WLC1.

The light transmitters LTU may be disposed in the third emission areas LA3, on the third insulating layer PAS3. The light transmitters LTU may be surrounded by the first light-blocking members BK1. The light transmitters LTU may transmit incident light therethrough while maintaining the peak wavelength of the incident light. Each of the light transmitters LTU may include a third base resin BS3 and a third scatterer SCT3.

The third base resin BS3 may include a material with relatively high light transmittance. The third base resin BS3 may be formed of a transparent organic material. For example, the third base resin BS3 may include the same material as the first or second base resin BS1 or BS2.

The third scatterer SCT3 may have a different refractive index from the third base resin BS3 and may form an optical interface with the third base resin BS3. For example, the third scatterer SCT3 may include a light-scattering material or light-scattering particles capable of scattering at least some of light passing through the light transmitters LTU. For example, the third scatterer SCT3 may include the same material as the first scatterers SCT1 of the first wavelength converters WLC1 and the second scatterers SCT2 of the second wavelength converters WLC2.

As the wavelength conversion layers WLCL may be disposed on (e.g., disposed directly on) the third insulating layer PAS3 of the light-emitting element layer EML, the display device 10 may not need a separate substrate for the first wavelength converters WLC1, the second wavelength converters WLC2, and the light transmitters LTU. Thus, the first wavelength converters WLC1, the second wavelength converters WLC2, and the light transmitters LTU can be readily aligned in the first emission areas LA1, the second emission areas LA2, and the third emission areas LA3, respectively, and the thickness of the display device 10 can be reduced.

The second passivation layer PV2 may cover the first wavelength converters WLC1, the second wavelength converters WLC2, the light transmitters LTU, and the first light-blocking members BK1. For example, the second passivation layer PV2 may seal the first wavelength converters WLC1, the second wavelength converters WLC2, and the light transmitters LTU and may thereby prevent the first wavelength converters WLC1, the second wavelength converters WLC2, and the light transmitters LTU from being damaged or polluted. For example, the second passivation layer PV2 may include an inorganic material.

The second planarization layer OC2 may be disposed on the second passivation layer PV2 to planarize the tops of the first wavelength converters WLC1, the second wavelength converters WLC2, and the light transmitters LTU. For example, the second planarization layer OC2 may include an organic insulating material such as polyimide.

The color filter layer CFL may be disposed on the wavelength conversion layer WLCL. The color filter layer CFL may include second light-blocking members BK2, the first color filters CF1, second color filters CF2, third color filters CF3, and a third passivation layer PV3.

The second light-blocking members BK2 may be disposed in the light-blocking area BA, on the second planarization layer OC2 of the wavelength conversion layer WLCL. The second light-blocking members BK2 may overlap the first light-blocking members BK1 or the sub-banks SB in the thickness direction (or the Z-axis direction). The second light-blocking members BK2 may block the transmission of light. The second light-blocking members BK2 may improve the color reproducibility of the display device 10 by preventing beams of light emitted from the first emission areas LA1, the second emission areas LA2, and the third emission areas LA3 from being mixed together. For example, in a plan view, the second light-blocking members BK2 may be arranged in a lattice form to surround the first emission areas LA1, the second emission areas LA2, and the third emission areas LA3.

The first color filters CF1 may be disposed in the first emission areas LA1, on the second planarization layer OC2. The first color filters CF1 may be surrounded by the second light-blocking members BK2. The first color filters CF1 may overlap the first wavelength converters WLC1 in the thickness direction (or the Z-axis direction). The first color filters CF1 may selectively transmit first-color light (e.g., red light) therethrough and may block or absorb second-color light (e.g., green light) and third-color light (e.g., blue light). For example, the first color filters CF1 may be red filters and may include a red colorant.

The second color filters CF2 may be disposed in the second emission areas LA2, on the second planarization layer OC2. The second color filters CF2 may be surrounded by the second light-blocking members BK2. The second color filters CF2 may overlap the second wavelength converters WLC2 in the thickness direction (or the Z-axis direction). The second color filters CF2 may selectively transmit second-color light (e.g., green light) therethrough and may block or absorb first-color light (e.g., red light) and third-color light (e.g., blue light). For example, the second color filters CF2 may be green filters and may include a green colorant.

The third color filters CF3 may be disposed in the third emission areas LA3, on the second planarization layer OC2. The third color filters CF3 may be surrounded by the second light-blocking members BK2. The third color filters CF3 may overlap the light transmitters LTU in the thickness direction (or the Z-axis direction). The third color filters CF3 may selectively transmit third-color light (e.g., blue light) therethrough and may block or absorb first-color light (e.g., red light) and second-color light (e.g., green light). For example, the third color filters CF3 may be blue filters and may include a blue colorant.

The first color filters CF1, the second color filters CF2, and the third color filters CF3 may reduce the reflection of external light by absorbing some of the external light. Thus, the first color filters CF1, the second color filters CF2, and the third color filters CF3 can prevent color distortions that may be caused by the reflection of external light.

As the first color filters CF1, the second color filters CF2, and the third color filters CF3 may be disposed on (e.g., disposed directly on) the second planarization layer OC2 of the wavelength conversion layer WLCL, the display device 10 may not need a separate substrate for the first color filters CF1, the second color filters CF2, and the third color filters CF3. Thus, the thickness of the display device 10 can be reduced.

The third passivation layer PV3 may cover the first color filters CF1, the second color filters CF2, and the third color filters CF3. The third passivation layer PV3 may protect the first color filters CF1, the second color filters CF2, and the third color filters CF3.

The encapsulation layer TFE may be disposed on the third passivation layer PV3 of the color filter layer CFL. The encapsulation layer TFE may cover the top surface and side surface of the display layer DPL. For example, the encapsulation layer TFE may include at least one inorganic film and may prevent the infiltration of oxygen or moisture. The encapsulation layer TFE may also include at least one organic film and may protect the display device such as foreign materials such as dust.

The antireflection film ARF may be disposed on the encapsulation layer TFE. The antireflection film ARF may prevent the reflection of external light and may thus reduce the degradation of the visibility of the display device 10 that may be caused by the reflection of external light. The antireflection film ARF may protect the top surface of the display device 10. The antireflection film ARF may not be provided. For example, the antireflection film ARF may be replaced with a polarizing film.

The flexible films FPCB may be disposed below the first substrate SUB1. The flexible films FPCB may be disposed along the edges of the bottom surface of the display device 10. The flexible films FPCB may be attached to the bottom surface of the first substrate SUB1 via the connecting films ACF. The flexible films FPCB may include the lead electrodes LDE, which may be disposed on the top surfaces of the flexible films FPCB. The lead electrodes LDE may be electrically connected to the protruding parts FOLa of the fan-out lines FOL through the connecting films ACF. The flexible films FPCB may support the display drivers DIC, which may be disposed on the bottom surfaces of the flexible films FPCB. The lead electrodes LDE may be electrically connected to the display drivers DIC via lead lines (not illustrated), which may be disposed on the bottom surfaces of the flexible films FPCB. The flexible films FPCB may be connected to source circuit boards (not illustrated), below the first substrate SUB1. The flexible films FPCB may transmit signals and voltages from the display drivers DIC to the display device 10.

The connecting films ACF may attach the lead electrodes LDE of the flexible films FPCB to the protruding parts FOLa of the fan-out lines FOL. First surfaces of the connecting films ACF may be attached to the protruding parts FOLa of the fan-out lines FOL, and second surfaces of the connecting films ACF may be attached to the lead electrodes LDE. For example, the connecting films ACF may include anisotropic conductive films. In this example, the connecting films ACF may have conductivity in regions where the protruding parts FOLa of the fan-out lines FOL and the lead electrodes LDE may be in contact with one another, and may electrically connect the flexible films FPCB to the fan-out lines FOL.

The display drivers DIC may be mounted on the flexible films FPCB. The display drivers DIC may be integrated circuits (ICs). The display drivers DIC may convert digital video data into analog data voltages in accordance with data control signals received from a timing controller (not illustrated) and may provide the analog data voltages to the data lines in the display area DA through the flexible films FPCB. The display drivers DIC may provide power supply voltages from a power supply unit (not illustrated) to the power lines of the display area DA through the flexible films FPCB. The display drivers DIC may generate gate signals in accordance with gate control signals and may sequentially provide the gate signals to gate lines in an order. As the display device 10 includes the fan-out lines FOL, which may be disposed on the first substrate SUB1, and the display drivers DIC, which may be disposed below the first substrate SUB1, the size of the non-display area NDA can be minimized.

Figure 6:
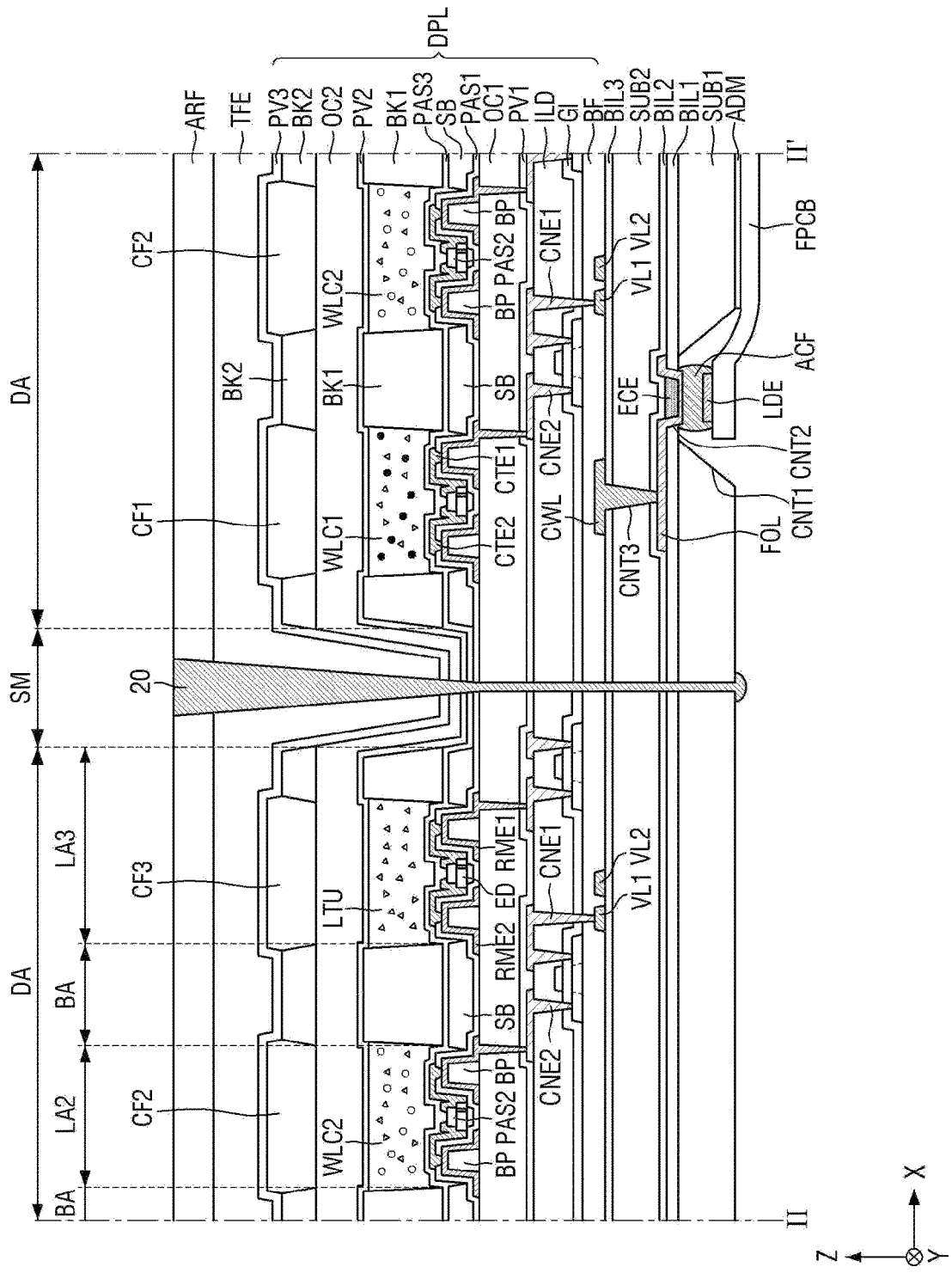
FIG. 6 is a schematic cross-sectional view taken along line II-II' of FIG. 1.

FIG. 6 is a schematic cross-sectional view taken along line II-II' of FIG. 1.

Referring to FIG. 6, the tiled display device TD may include multiple display devices 10 and a bonding member 20. Specifically, the tiled display device TD may include the first through fourth display devices 10-1 through 10-4. The number of display devices 10 included in the tiled display device TD and how the display devices 10 may be coupled to one another are not particularly limited. The number of display devices 10 included in the tiled display device TD may be determined by the size of the display devices 10 and the size of the tiled display device TD.

Each of the display devices 10 may include a display area DA and a non-display area NDA. The display area DA may include pixels and may display an image. The non-display area NDA may be disposed around the display area DA to surround the display area DA and may not display an image.

The tiled display device TD may include a bonding area SM, which may be disposed between multiple display areas DA. The tiled display device TD may be obtained by connecting the non-display areas NDA of the display devices 10. The display devices 10 may be connected to one another via a bonding member or an adhesive member disposed in the bonding area SM. The bonding area SM may not include pad units or fan-out lines attached to pad units. Thus, the distance between the display areas DA of the display devices 10 may be so close that the bonding area SM may become almost invisible to the user. The reflectance of the display areas DA of the display devices 10 may be substantially the same as the reflectance of the bonding area SM. Thus, the tiled display device TD can overcome the sense of discontinuity between the display devices 10 and improve the degree of immersion of an image by preventing the bonding area SM from becoming recognizable to the user.

In the tiled display device TD, the sides of the display devices 10 may be bonded together via a bonding member 20, which may be disposed between the display devices 10. The bonding member 20 may connect the sides of the first, second, third, and fourth display devices 10-1, 10-2, 10-3, and 10-4, which may be arranged in a lattice pattern, and may thus realize the tiled display device TD. The bonding member 20 may couple the sides of first substrates SUB1, first barrier insulating layers BIL1, second barrier insulating layers BIL2, second substrates SUB2, third barrier insulating layers BIL3, display layers DPL, encapsulation layers TFE, and antireflection layers ARF of every two adjacent display devices 10 together.

For example, the bonding member 20 may be formed as a relatively thin adhesive or double-sided tape and may thus minimize the distance between the display devices 10. In another example, the bonding member 20 may be formed as a relatively thin bonding frame and may thus minimize the distance between the display devices 10. Thus, the tiled display device TD can prevent the bonding area SM between the display devices 10 from becoming visible to the user.

Figure 12:
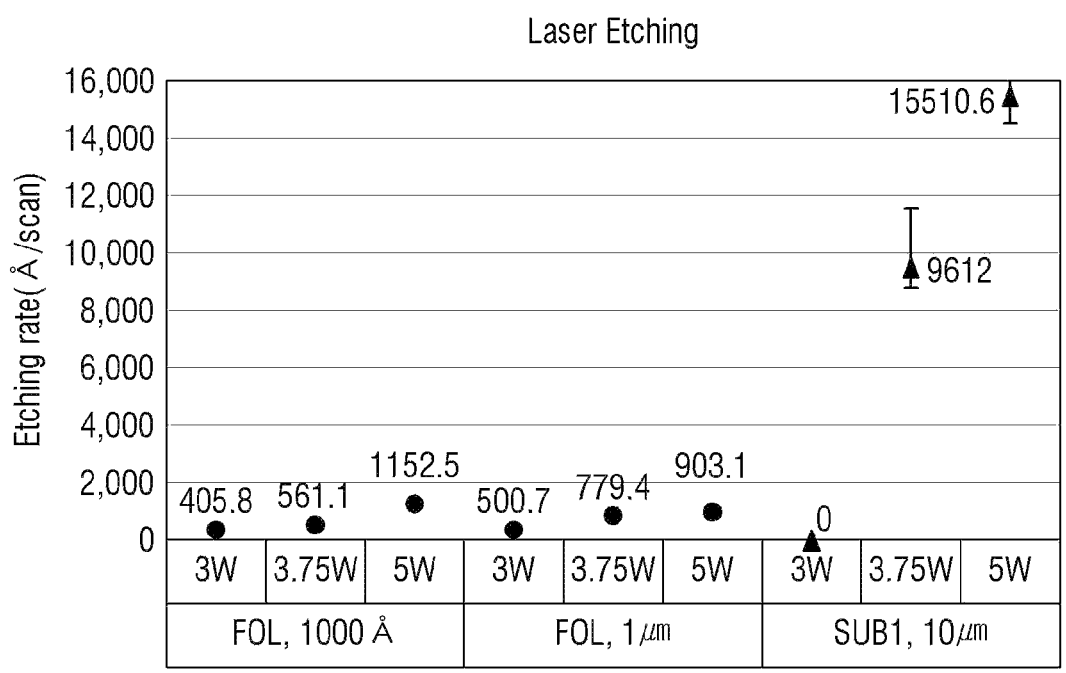
FIG. 12 is a schematic graph showing laser etching rates according to an embodiment of the disclosure.
Figure 13:
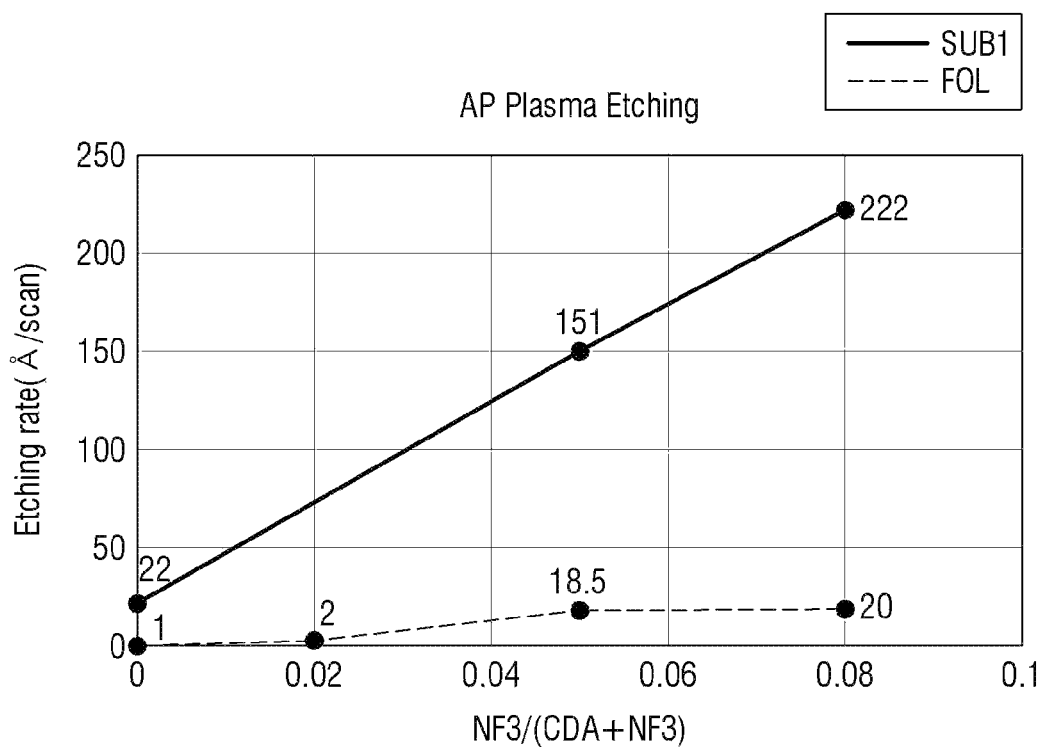
FIG. 13 is a schematic graph showing atmospheric pressure (AP) plasma etching rates according to an embodiment of the disclosure.
Figure 14:
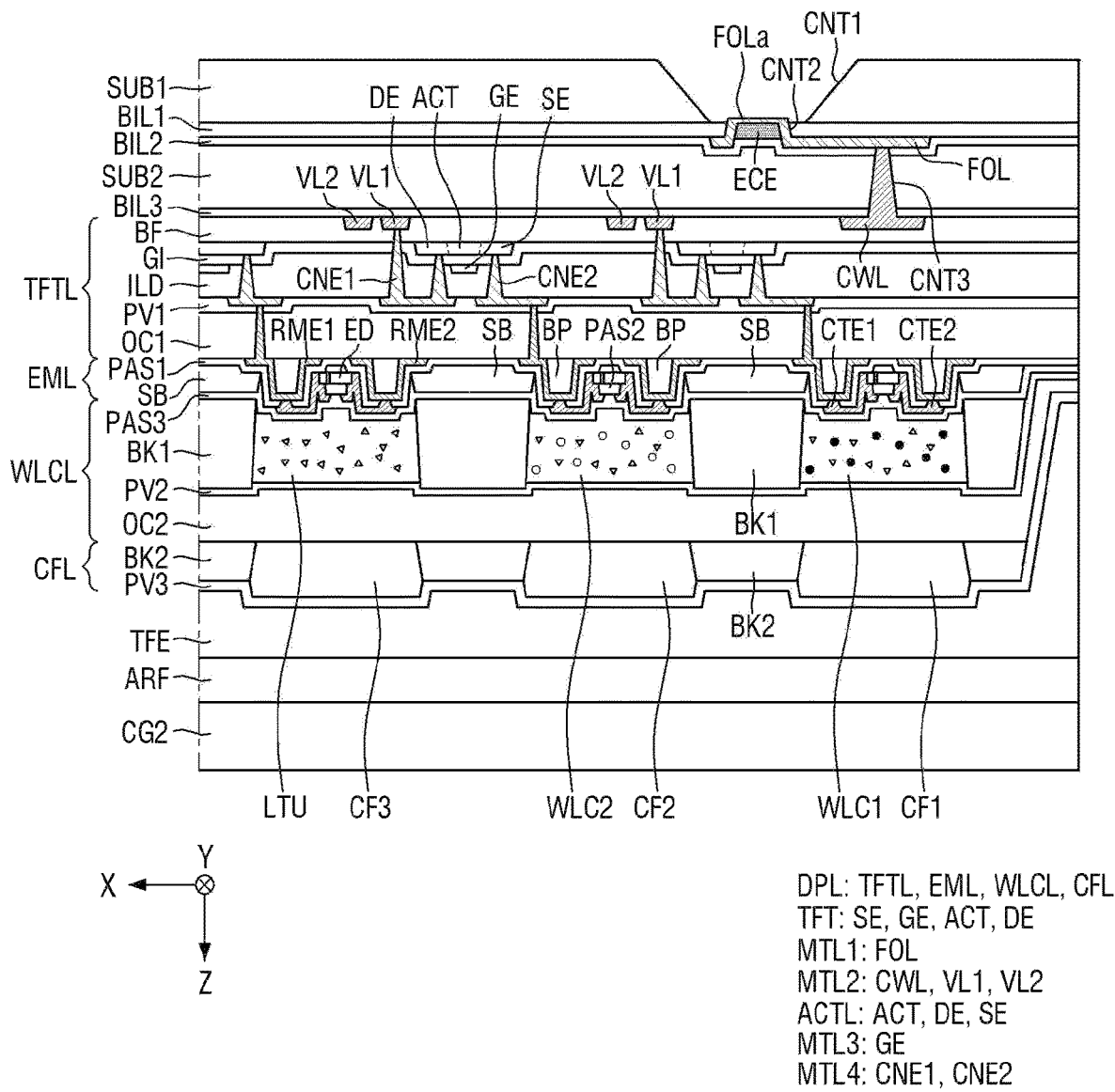
FIGS. 14 through 16 are schematic cross-sectional views illustrating how to fabricate a display device according to an embodiment of the disclosure.
Figure 15:
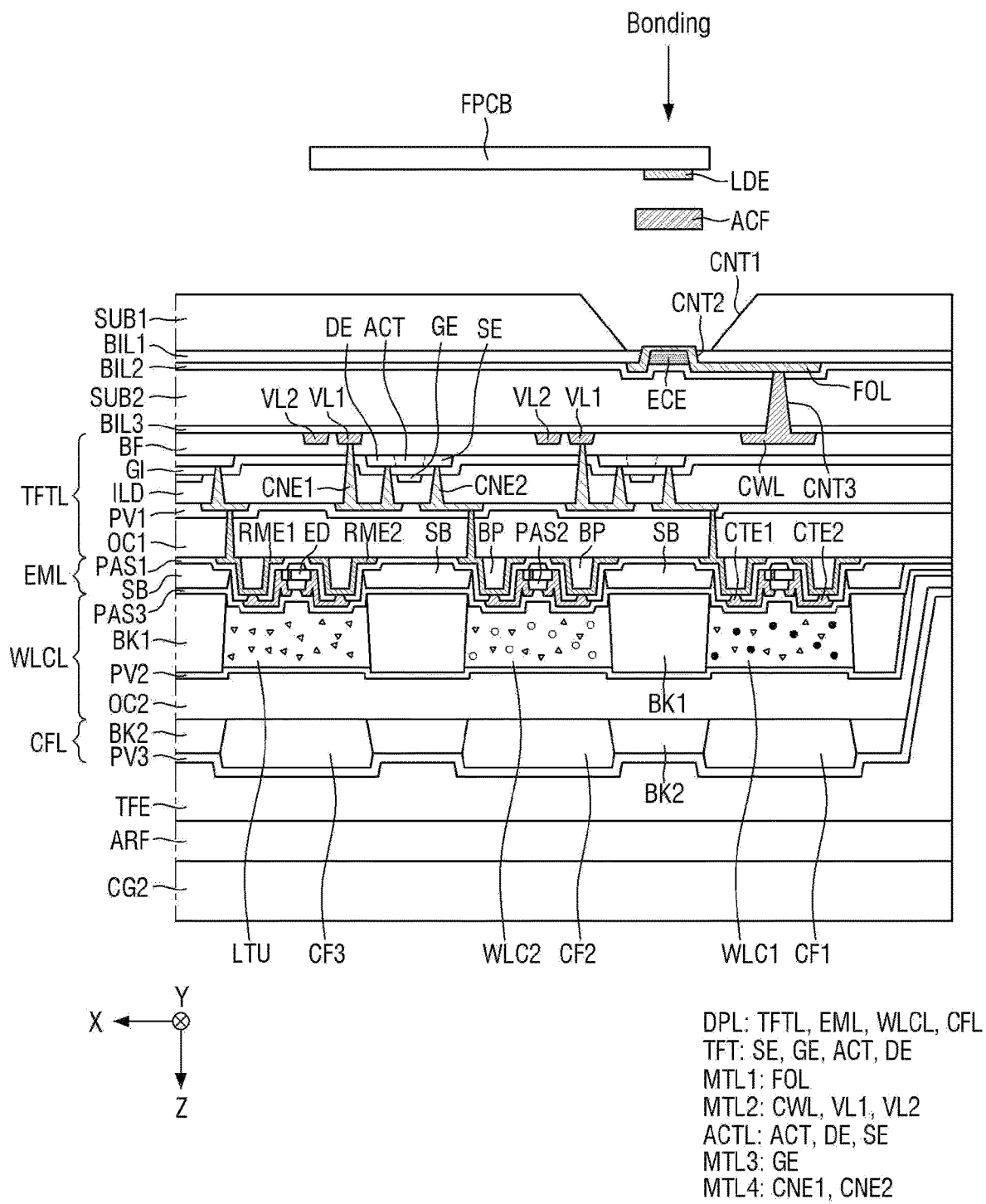
Figure 16:
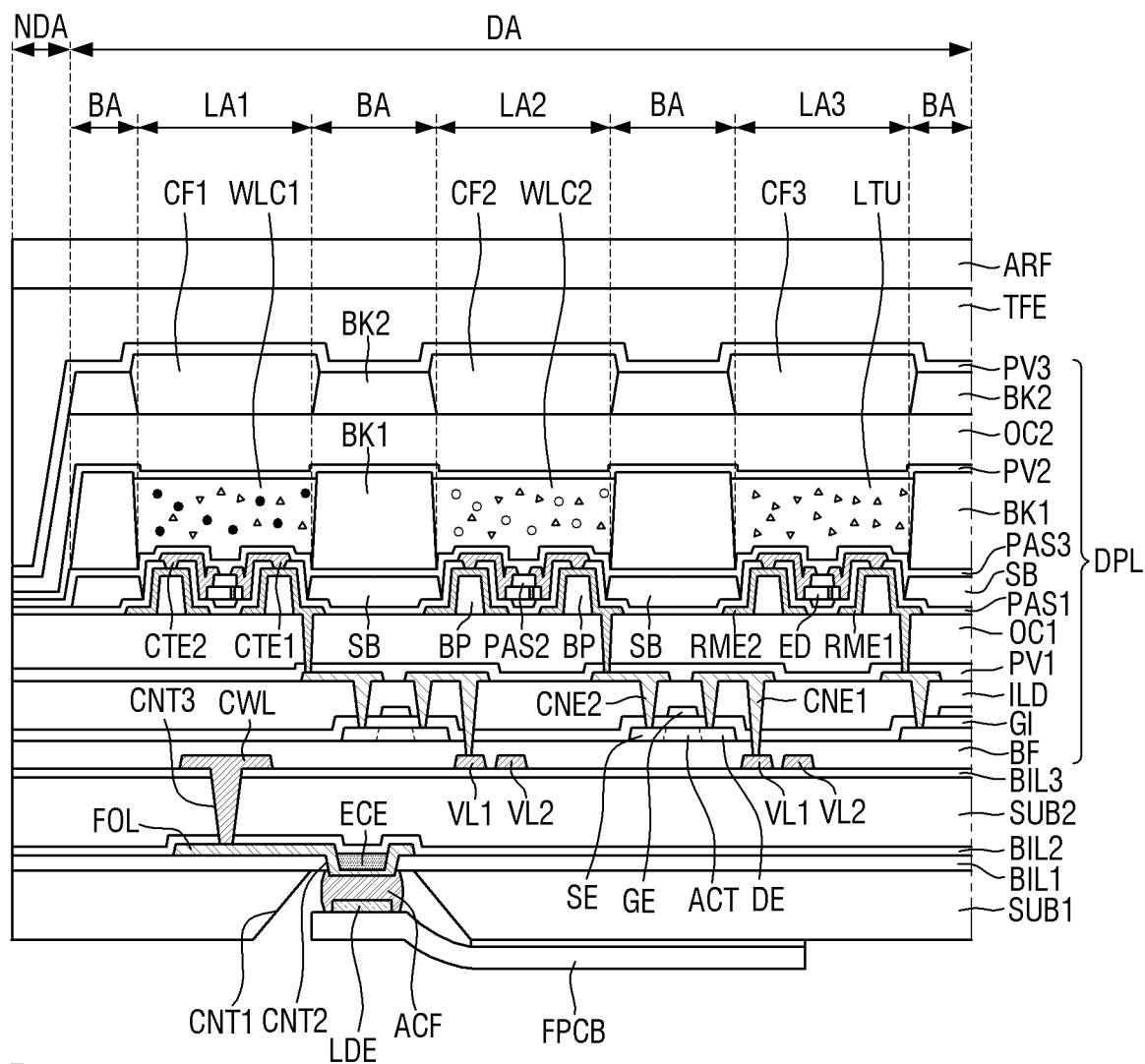

FIGS. 7 through 11 are schematic cross-sectional views illustrating how to fabricate the display device 10. FIG. 12 is a schematic graph showing laser etching rates according to an embodiment of the disclosure. FIG. 13 is a schematic graph showing atmospheric pressure (AP) plasma etching rates according to an embodiment of the disclosure. FIGS. 14 through 16 are schematic cross-sectional views illustrating how to fabricate a display device 10 according to an embodiment of the disclosure.

Figure 7:
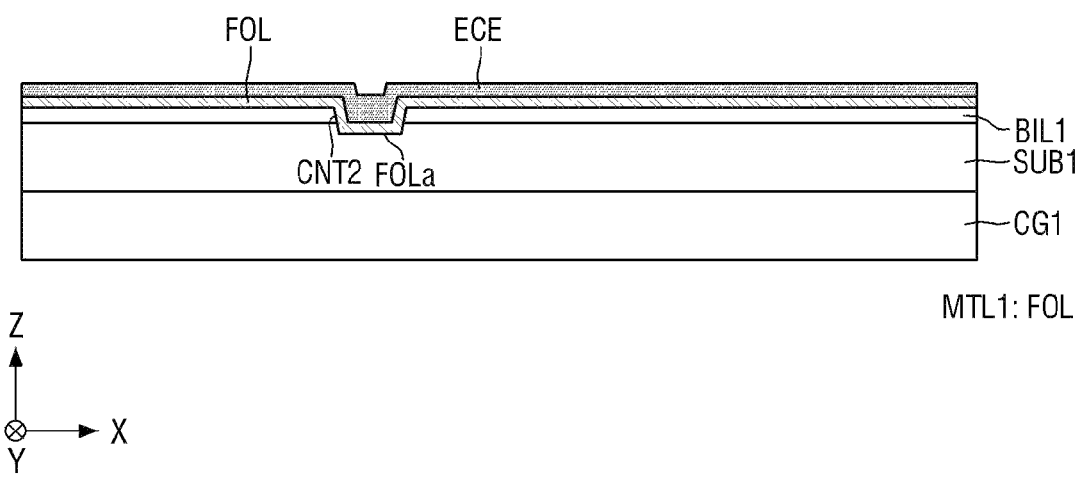
FIGS. 7 through 11 are schematic cross-sectional views illustrating how to fabricate the display device of FIG. 4.

Referring to FIG. 7, a first carrier substrate CG1 may support the display device 10 during the fabrication of the display device 10. For example, the first carrier substrate CG1 may include carrier glass, but the disclosure is not limited thereto.

The first substrate SUB1 may be disposed on the first carrier substrate CG1. The first substrate SUB1 may be a base substrate or a base member. For example, the first substrate SUB1 may include an insulating material such as a polymer resin (e.g., polyimide), but the disclosure is not limited thereto.

The first barrier insulating layer BIL1 may be disposed on the first substrate SUB1. The first barrier insulating layer BIL1 may include an inorganic film capable of preventing the infiltration of the air or moisture. The first barrier insulating layer BIL1 may include a second contact hole CNT2. The second contact hole CNT2 may be etched from the top surface of the first barrier insulating layer BIL1 to penetrate through to the top of the first substrate SUB1. The second contact hole CNT2 may be formed by dry etching or wet etching, but the disclosure is not limited thereto.

The first metal layer MTL1 may be disposed on the first barrier insulating layer BIL1. The first metal layer MTL1 may include a fan-out line FOL. A protruding part FOLa of the fan-out line FOL may be inserted in the second contact hole CNT2, into the top of the first substrate SUB1. The first metal layer MTL1 may be formed as a single layer or a multilayer including at least one of Mo, Al, Cr, Au, Ag, Ti, Ni, Pd, In, Nd, and Cu. For example, the fan-out line FOL may include Ti and may thus be able to be readily formed on the first barrier insulating layer BIL1. However, the material of the fan-out line FOL is not particularly limited. The fan-out line FOL may have the second thickness T2. The thickness of the protruding part FOLa of the fan-out line FOL before etching may be greater than the thickness of the protruding part FOLa of the fan-out line FOL after etching, i.e., the first thickness T1.

An etching electrode ECE may be disposed on the first metal layer MTL1. The etching electrode ECE may be inserted in a recessed part FOLb of the fan-out line FOL. The etching electrode ECE may be formed as a single layer or a multilayer including at least one of Mo, Al, Cr, Au, Ag, Ti, Ni, Pd, In, Nd, and Cu. For example, the etching electrode ECE may include Cu, but the disclosure is not limited thereto.

Figure 8:
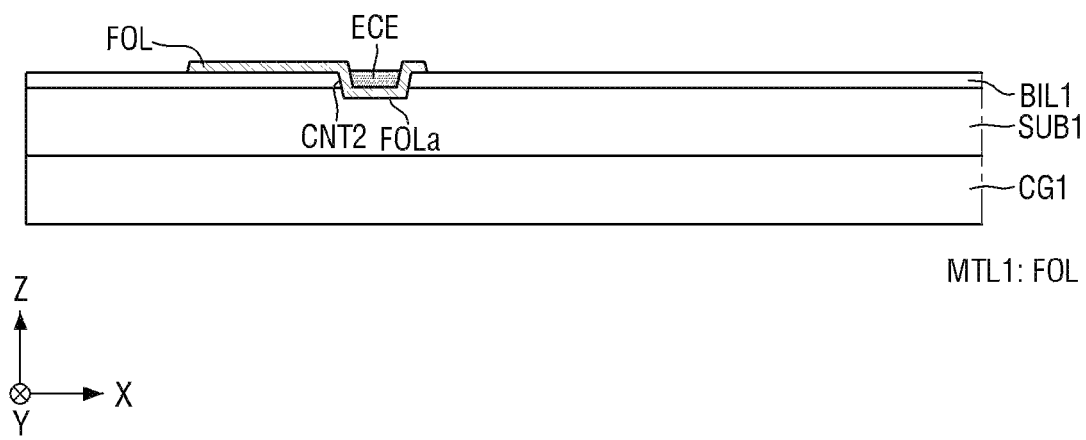

Referring to FIG. 8, the etching electrode ECE and the fan-out line FOL may be formed by wet etching or dry etching. During laser etching or AP plasma etching, the etching rate of the etching electrode ECE may be much faster than the etching rate of the fan-out line FOL. The etching electrode ECE may be able to remain in the recessed part FOLb of the fan-out line FOL, which may be formed by the second contact hole CNT2, due to its different etching rate from the fan-out line FOL. The remaining etching electrode ECE may have the third thickness T3. The third thickness T3 may be greater than the thickness of the fan-out line FOL, i.e., the second thickness T2. The third thickness T3 may be about 1.2 to about 2 times greater than the second thickness T2. For example, the second thickness T2 may be, but is not limited to, about 2000 Å or greater, and the third thickness T3 may be, but is not limited to, about 3000 Å or greater.

Figure 9:
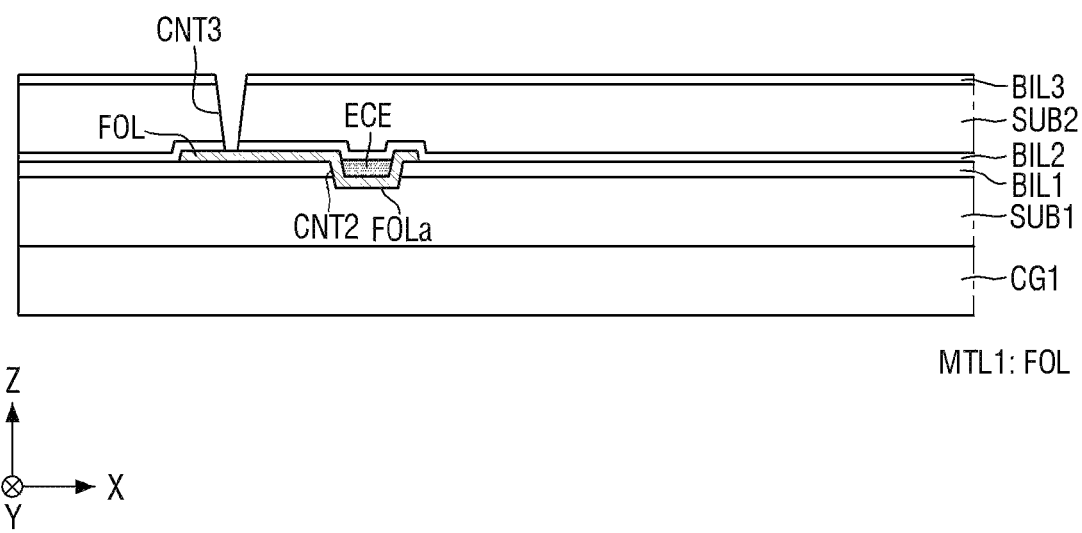

Referring to FIG. 9, the second barrier insulating layer BIL2 may be disposed on the first barrier insulating layer BIL1, the fan-out line FOL, and the etching electrode ECE. The second substrate SUB2 and the third barrier insulating layer BIL3 may be sequentially stacked on the second barrier insulating layer BIL2. A third contact hole CNT3 may be etched from the top surface of the third barrier insulating layer BIL3 to penetrate through to the bottom surface of the second barrier insulating layer BIL2. For example, the second and third barrier insulating layers BIL2 and BIL3 and the second substrate SUB2 may be penetrated by dry etching or wet etching, but the disclosure is not limited thereto. The top surface of the fan-out line FOL may be exposed by the third contact hole CNT3.

Figure 10:
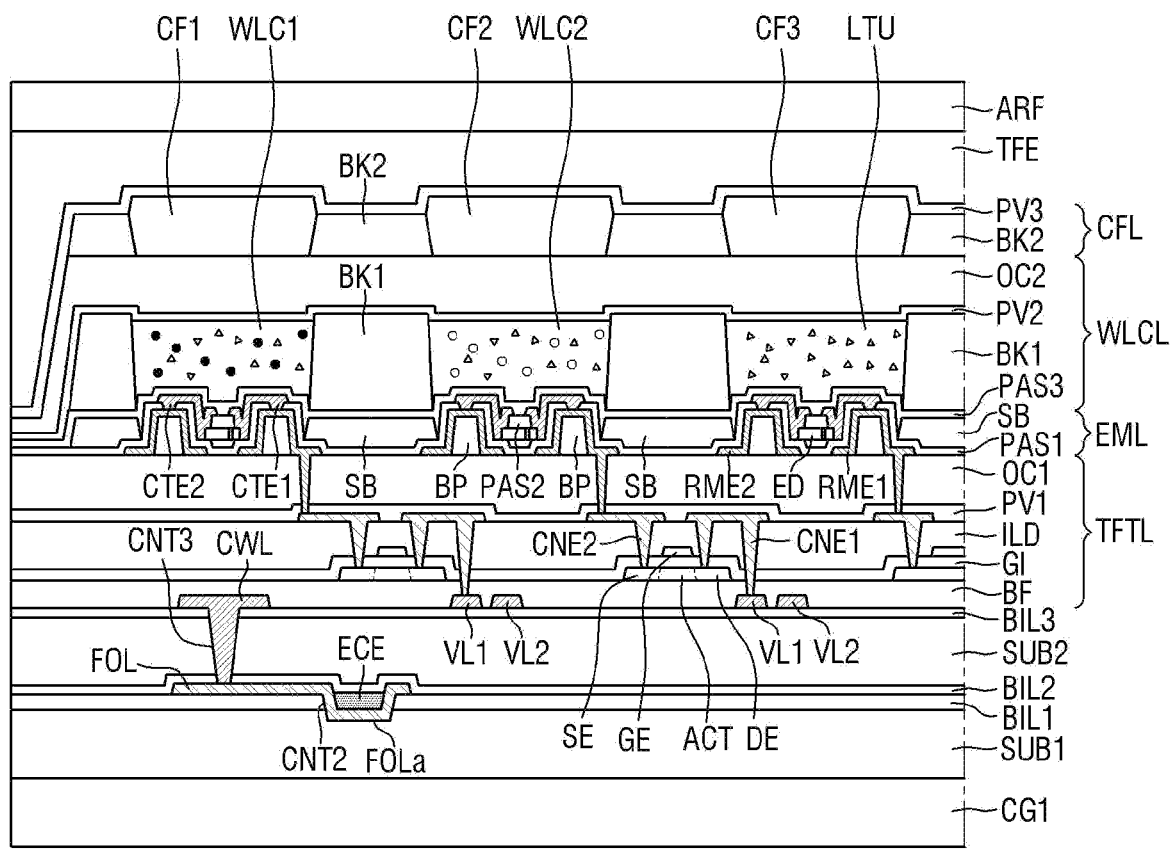
Figure 11:
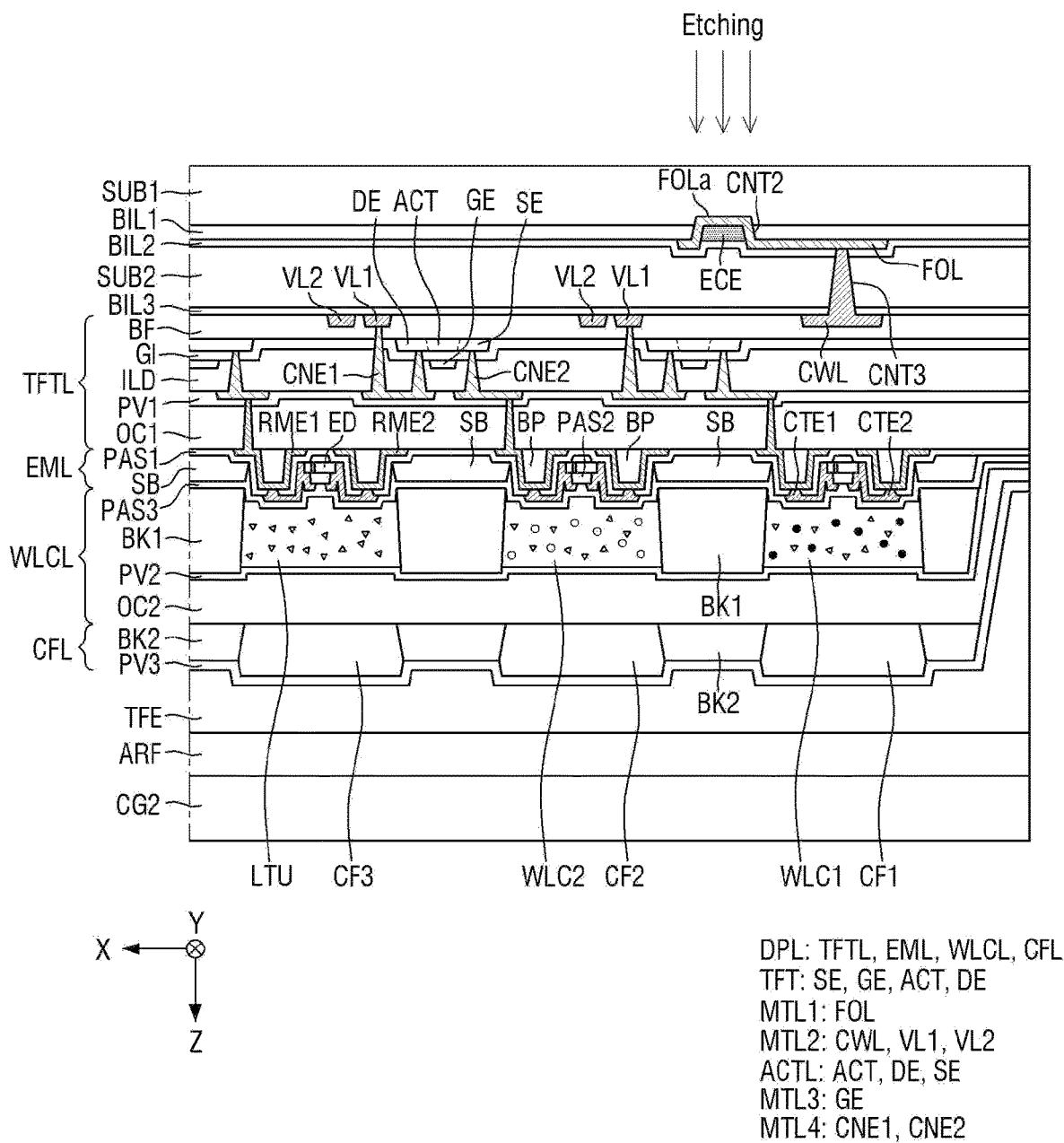

Referring to FIG. 10, the display layer DPL may be stacked on the third barrier insulating layer BIL3. The TFT layer TFTL, the light-emitting element layer EML, the wavelength conversion layer WLCL, and the color filter layer CFL may be sequentially stacked on the third barrier insulating layer BIL3. An encapsulation layer TFE may cover the top surface and sides of the display layer DPL. An antireflection film ARF may be formed on the encapsulation layer TFE.

Referring to FIGS. 11 through 14, the display device 10 may be turned upside down to form a flexible film FPCB. The first carrier substrate CG1 may be removed from the first substrate SUB1. For example, the first carrier substrate CG1 may be removed from the bottom (e.g., the top as inverted) of the first substrate SUB1 by using a sacrificial layer (not illustrated) between the first carrier substrate CG1 and the first substrate SUB1, but the disclosure is not limited thereto.

A second carrier substrate CG2 may be disposed on a surface of the antireflection film ARF. The second carrier substrate CG2 may support the display device 10 that has been turned upside down. For example, the second carrier substrate CG2 may be carrier glass, but the disclosure is not limited thereto.

Part of the first substrate SUB1 may be etched by laser etching. Referring to FIG. 12, during laser etching, the etching rate of the first substrate SUB1 may be much faster than the etching rate of the fan-out line FOL.

For example, in a case where the first substrate SUB1 has a thickness of 10 μm, a 3 W laser scan may not be able to cause laser ablation and etch the first substrate SUB1, a 3.75 W laser scan may be able to etch the first substrate SUB1 by an average of about 9612 Å, and a 5 W laser scan may be able to etch the first substrate SUB1 by an average of about 15510.6 Å.

For example, in a case where the fan-out line FOL has a thickness of 1 μm, a 3 W laser scan may be able to etch the fan-out line FOL by an average of about 500.7 Å, a 3.75 W laser scan may be able to etch the fan-out line FOL by an average of about 779.4 Å, and a 5 W laser scan may be able to etch the fan-out line FOL by an average of about 903.1 Å.

For example, in a case where the fan-out line FOL has a thickness of 1000 Å, a 3 W laser scan may be able to etch the fan-out line FOL by an average of about 405.8 Å, a 3.75 W laser scan may be able to etch the fan-out line FOL by an average of about 561.1 Å, and a 5 W laser scan may be able to etch the fan-out line FOL by an average of about 1152.5 Å.

Part of the first substrate SUB1 may be etched by AP plasma etching. Referring to FIG. 13, during AP plasma etching, the etching rate of the first substrate SUB1 may be much faster than the etching rate of the fan-out line FOL. AP plasma etching may etch the first substrate SUB1 using an etching gas. The etching gas may include at least one of nitrogen trifluoride ($NF_3$), carbon tetrafluoride ($CF_4$), methane fluoride ($CH_3F$), and methane difluoride ($CH_2F_2$), but the disclosure is not limited thereto.

For example, in a case where the etching gas includes $NF_3$, the greater the $NF_3$ content of the etching gas, the higher the etching rate. In a case where the etching gas contains 0.05% of $NF_3$, the etching rate of the first substrate SUB1 may be about 151 Å/scan, and the etching rate of the fan-out line FOL may be about 18.5 Å/scan. In a case where the etching gas contains 0.08% of $NF_3$, the etching rate of the first substrate SUB1 may be about 222 Å/scan, and the etching rate of the fan-out line FOL may be about 20 Å/scan.

Thus, the first substrate SUB1 may be etched relatively fast so that a first contact hole CNT1 may be formed, and the stronger the power of a laser scan, the more likely the protruding part FOLa of the fan-out line FOL is to be etched. As the protruding part FOLa of the fan-out line FOL may be partially etched, the protruding part FOLa of the fan-out line FOL may have the first thickness T1. The thickness of the fan-out line FOL, i.e., the second thickness T2, may be greater than the thickness of the protruding part FOLa of the fan-out line FOL, i.e., the first thickness T1. The second thickness T2 may be about at least twice the first thickness T1. For example, the first thickness T1 may be, but is not limited to, about 500 Å or greater, and the second thickness T2 may be, but is not limited to, about 2000 Å or greater.

Therefore, even if the protruding part FOLa of the fan-out line FOL may be excessively etched during the etching of the first substrate SUB1, part of the protruding part FOLa may still be able to remain below the first barrier insulating layer BIL1 and may thus be readily connected to the lead electrode LDE of the flexible film FPCB. Accordingly, even in case that at least one of laser etching and AP plasma etching is used, the reliability of the protruding part FOLa of the fan-out line FOL can be improved.

Referring to FIGS. 15 and 16, the flexible film FPCB may be disposed on a surface of the first substrate SUB1. The flexible film FPCB and a connecting film ACF may be aligned on the protruding part FOLa of the fan-out line FOL. For example, the flexible film FPCB and the connecting film ACF may be attached to the protruding part FOLa of the fan-out line FOL through ultrasonic bonding or thermal bonding, but the disclosure is not limited thereto. The connecting film ACF may have conductivity in an area where the protruding part FOLa of the fan-out line FOL and a lead electrode LDE may be in contact with each other, and may electrically connect the flexible film FPCB to the fan-out line FOL.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. A display device comprising:
   a first substrate, the first substrate including a first contact hole;
   a first barrier insulating layer disposed on the first substrate and including a second contact hole;
   a fan-out line disposed in a first metal layer on the first barrier insulating layer, the fan-out line including:
   a protruding part penetrating the second contact hole to protrude from below a bottom surface of the first barrier insulating layer, the thickness of the fan-out line being greater than a thickness of the protruding part of the fan-out line; and
   a recessed part formed by the second contact hole;
   an etching electrode disposed in the recessed part of the fan-out line;
   a second substrate disposed on the fan-out line and the etching electrode and including a third contact hole;
   a display layer disposed on the second substrate; and
   a flexible film disposed below the first substrate with at least a portion of the flexible film inserted in the first contact hole to be electrically connected to the protruding part of the fan-out line,
   wherein a height of a top surface of the etching electrode is less than a height of a top surface of the fan-out line.

2. The display device of claim 1, wherein
   a thickness of the etching electrode is greater than a thickness of the fan-out line.

3. The display device of claim 2, wherein the thickness of the fan-out line is at least twice the thickness of the protruding part of the fan-out line.

4. The display device of claim 2, wherein the thickness of the etching electrode is about 1.2 to about 2 times greater the thickness of the fan-out line.

5. The display device of claim 2, wherein
   the thickness of the etching electrode is about 3000 Å or more,
   the thickness of the fan-out line is about 2000 Å or more, and
   the thickness of the protruding part of the fan-out line is about 500 Å or more.

6. The display device of claim 1, wherein
   the fan-out line includes titanium, and
   the etching electrode includes copper.

7. The display device of claim 1, further comprising:
   a display driver mounted on the flexible film and providing at least one of a data voltage, a power supply voltage, and a gate signal.

8. The display device of claim 1, wherein the display layer comprises:
   a connection line disposed in a second metal layer on the second substrate; and
   a thin-film transistor disposed in an active layer on the second metal layer and in a third metal layer.

9. The display device of claim 8, wherein the flexible film provides at least one of a data voltage, a power supply voltage, and a gate signal to the thin-film transistor through the fan-out line and the connection line.

10. The display device of claim 8, further comprising:
    a voltage line disposed in the second metal layer and electrically connected to the thin-film transistor.

11. The display device of claim 10, further comprising:
    a connection electrode disposed in a fourth metal layer on the third metal layer, wherein an end of the connection electrode is connected to the voltage line, and
another end of the connection electrode is connected to the thin-film transistor.

12. The display device of claim 11, further comprising:
a light-emitting element layer disposed on the fourth metal layer,
wherein the light-emitting element layer comprises:
   a first electrode connected to a first connection electrode;
   a second electrode disposed in a same layer as the first electrode, the second electrode connected to a second connection electrode; and
   light-emitting elements aligned between the first and second electrodes and electrically connected between the first and second electrodes.

13. The display device of claim 1, wherein the protruding part penetrates into only a top portion of the first contact hole.

14. The display device of claim 1, further comprising a second barrier insulating layer disposed directly on the first barrier insulating layer, the fan-out line, and the etching electrode.

15. A method of manufacturing a display device, comprising:
providing a substrate;
providing a barrier insulating layer disposed on the substrate and including a first contact hole;
forming a fan-out line disposed on the barrier insulating layer and including a protruding part penetrating the first contact hole to protrude from below a bottom surface of the first barrier insulating layer and a recessed part formed by the first contact hole;
forming an etching electrode on the fan-out line;
etching the fan-out line and the etching electrode such that the etching electrode remains in the recessed part;
forming a display layer on the fan-out line and the etching electrode;
forming a second contact hole penetrating from below the substrate and partially etching a bottom surface of the protruding part, the thickness of the fan-out line being greater than a thickness of the protruding part of the fan-out line; and
forming a flexible film disposed below the substrate, inserted in the second contact hole, and electrically connected to the protruding part of the fan-out line,
wherein a height of a top surface of the etching electrode is less than a height of a top surface of the fan-out line.

16. The method of claim 15, wherein a thickness of the fan-out line is at least twice a thickness of the protruding part of the fan-out line where partially-etched.

17. The method of claim 15, wherein
the thickness of the etching electrode is about 3000 Å or more,
the thickness of the fan-out line is about 2000 Å or more, and
the thickness of the partially-etched protruding part of the fan-out line is about 500 Å or more.

18. The method of claim 15, wherein the forming the second contact hole comprises performing at least one of laser etching and atmospheric pressure (AP) plasma etching.

19. The method of claim 15, wherein a thickness of the etching electrode is about 1.2 to about 2 times greater than a thickness of the fan-out line.

20. A tiled display device comprising:
a plurality of display devices, each of the plurality of display devices having a display area including pixels, and a non-display area surrounding the display area; and
a bonding member bonding the plurality of display devices to each other,
wherein each of the display devices comprises:
a first substrate including a first contact hole;
a first barrier insulating layer disposed on the first substrate and including a second contact hole;
a fan-out line disposed in a first metal layer on the first barrier insulating layer, the fan-out line including:
   a protruding part penetrating the second contact hole to protrude from below a bottom surface of the first barrier insulating layer, the thickness of the fan-out line being greater than a thickness of the protruding part of the fan-out line; and
   a recessed part formed by the second contact hole;
an etching electrode disposed in the recessed part of the fan-out line;
a second substrate disposed on the fan-out line and the etching electrode and including a third contact hole;
a display layer disposed on the second substrate; and
a flexible film disposed below the first substrate and inserted in the first contact hole to be electrically connected to the protruding part of the fan-out line,
wherein a height of a top surface of the etching electrode is less than a height of a top surface of the fan-out line.

* * * * *